(12) United States Patent
Kamble et al.

(10) Patent No.: US 8,588,224 B2
(45) Date of Patent: Nov. 19, 2013

(54) PRIORITY BASED FLOW CONTROL IN A DISTRIBUTED FABRIC PROTOCOL (DFP) SWITCHING NETWORK ARCHITECTURE

(75) Inventors: Keshav Kamble, Fremont, CA (US); Dayavanti G. Kamath, Santa Clara, CA (US); Jayakrishna Kidambi, San Jose, CA (US); Dar-Ren Leu, San Jose, CA (US); Chandarani J. Mendon, San Jose, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 13/107,893

(22) Filed: May 14, 2011

(65) Prior Publication Data

US 2012/0287786 A1    Nov. 15, 2012

(51) Int. Cl.
*H04L 12/58* (2006.01)
(52) U.S. Cl.
USPC ............... 370/388; 370/395.21; 370/395.42; 370/413
(58) Field of Classification Search
USPC ............... 370/388, 395.21, 395.42, 395.43, 370/412–418
See application file for complete search history.

(56) References Cited

U.S. PATENT DOCUMENTS

| | | | |
|---|---|---|---|
| 5,394,402 A | 2/1995 | Ross | |
| 5,617,421 A | 4/1997 | Chin et al. | |
| 5,742,604 A | 4/1998 | Edsall et al. | |
| 6,304,901 B1 | 10/2001 | McCloghrie et al. | |
| 6,567,403 B1 | 5/2003 | Congdon et al. | |
| 6,901,452 B1 * | 5/2005 | Bertagna | 709/240 |
| 7,593,320 B1 | 9/2009 | Cohen et al. | |
| 7,848,226 B2 | 12/2010 | Morita | |
| 2004/0088451 A1 | 5/2004 | Han | |
| 2006/0029072 A1 | 2/2006 | Perera et al. | |

(Continued)

FOREIGN PATENT DOCUMENTS

| | | |
|---|---|---|
| CN | 01897567 A | 1/2007 |
| CN | 101030959 A | 9/2007 |
| CN | 101087238 A | 12/2007 |

OTHER PUBLICATIONS

International Searching Authority; Int. Appln. No. PCT/IB2012/051803; International Search Report dated Sep. 13, 2012 (7 pgs.).

(Continued)

*Primary Examiner* — Hoon J Chung
(74) *Attorney, Agent, or Firm* — Yudell Isidore Ng Russell PLLC

(57) ABSTRACT

A switching network includes an upper tier and a lower tier including a plurality of lower tier entities. A master switch in the upper tier, which has a plurality of ports each coupled to a respective lower tier entity, implements on each of the ports a plurality of virtual ports each corresponding to a respective one of a plurality of remote physical interfaces (RPIs) at the lower tier entity coupled to that port. Data traffic communicated between the master switch and RPIs is queued within virtual ports that correspond to the RPIs on lower tier entities with which the data traffic is communicated. The master switch enforces priority-based flow control (PFC) on data traffic of a given virtual port by transmitting, to a lower tier entity on which a corresponding RPI resides, a PFC data frame specifying priorities for at least two different classes of data traffic communicated by the particular RPI.

12 Claims, 16 Drawing Sheets

(56) References Cited

U.S. PATENT DOCUMENTS

| | | | |
|---|---|---|---|
| 2009/0213869 A1 | 8/2009 | Rajendran et al. | |
| 2010/0054129 A1* | 3/2010 | Kuik et al. | 370/235 |
| 2010/0054260 A1* | 3/2010 | Pandey et al. | 370/395.53 |
| 2010/0226368 A1* | 9/2010 | Mack-Crane et al. | 370/390 |
| 2010/0303075 A1* | 12/2010 | Tripathi et al. | 370/392 |
| 2011/0007746 A1* | 1/2011 | Mudigonda et al. | 370/395.21 |
| 2011/0032944 A1 | 2/2011 | Elzur et al. | |
| 2011/0134793 A1* | 6/2011 | Elsen et al. | 370/254 |
| 2012/0287785 A1* | 11/2012 | Kamble et al. | 370/230.1 |
| 2012/0287786 A1* | 11/2012 | Kamble et al. | 370/235 |
| 2012/0287787 A1* | 11/2012 | Kamble et al. | 370/235 |
| 2012/0287939 A1* | 11/2012 | Leu et al. | 370/409 |
| 2012/0320749 A1* | 12/2012 | Kamble et al. | 370/235 |
| 2013/0022050 A1* | 1/2013 | Leu et al. | 370/400 |
| 2013/0064067 A1* | 3/2013 | Kamath et al. | 370/218 |
| 2013/0064068 A1* | 3/2013 | Kamath et al. | 370/222 |

OTHER PUBLICATIONS

Pettit et al., Virtual Switching in an Era of Advanced Edges, pp. 1-7, Nicira Networks, Palo Alto, California. Version date Jul. 2010.

Pfaff et al., Extending Networking into the Virtualization Layer, pp. 1-6, Oct. 2009, Proceedings of the 8th ACM Workshop on Hot Topics in Networks (HotNets-VIII), New York City, New York.

Sherwood et al., FlowVisor: A Network Virtualization Layer, pp. 1-14, Oct. 14, 2009, Deutsche Telekom Inc. R&D Lab, Stanford University, Nicira Networks.

Yan et al., Tesseract: A 4D Network Control Plane, pp. 1-15, NSDI'07 Proceedings of the 4th USENIX conference on Networked systems design & implementation USENIX Association Berkeley, CA, USA 2007.

Hunter et al., BladeCenter, IBM Journal of Research and Development, vol. 49, No. 6, p. 905. Nov. 2005.

VMware, Inc., "VMware Virtual Networking Concepts", pp. 1-12, Latest Revision: Jul. 29, 2007 http://www.vmware.com/files/pdf/virtual_networking_concepts.pdf.

* cited by examiner

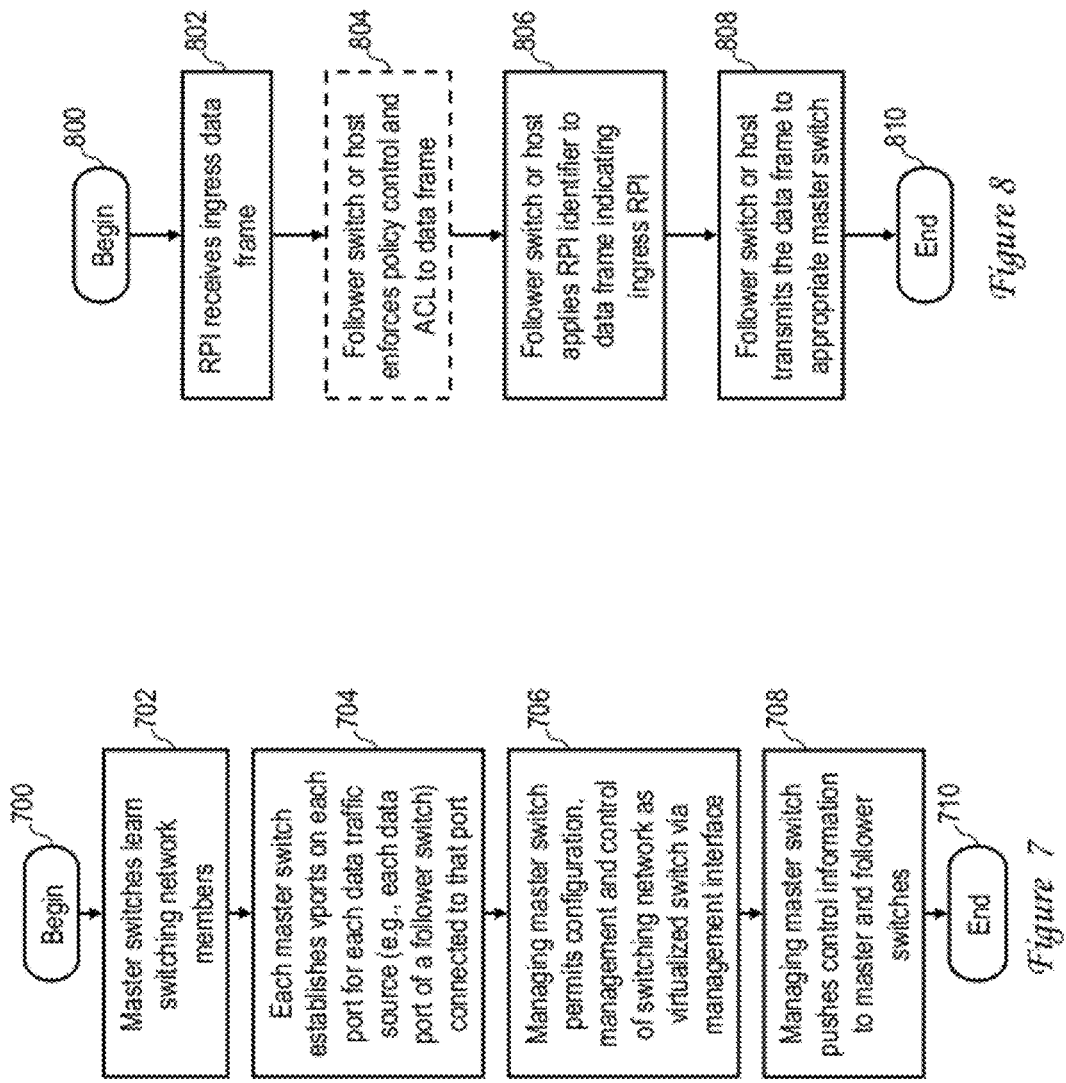

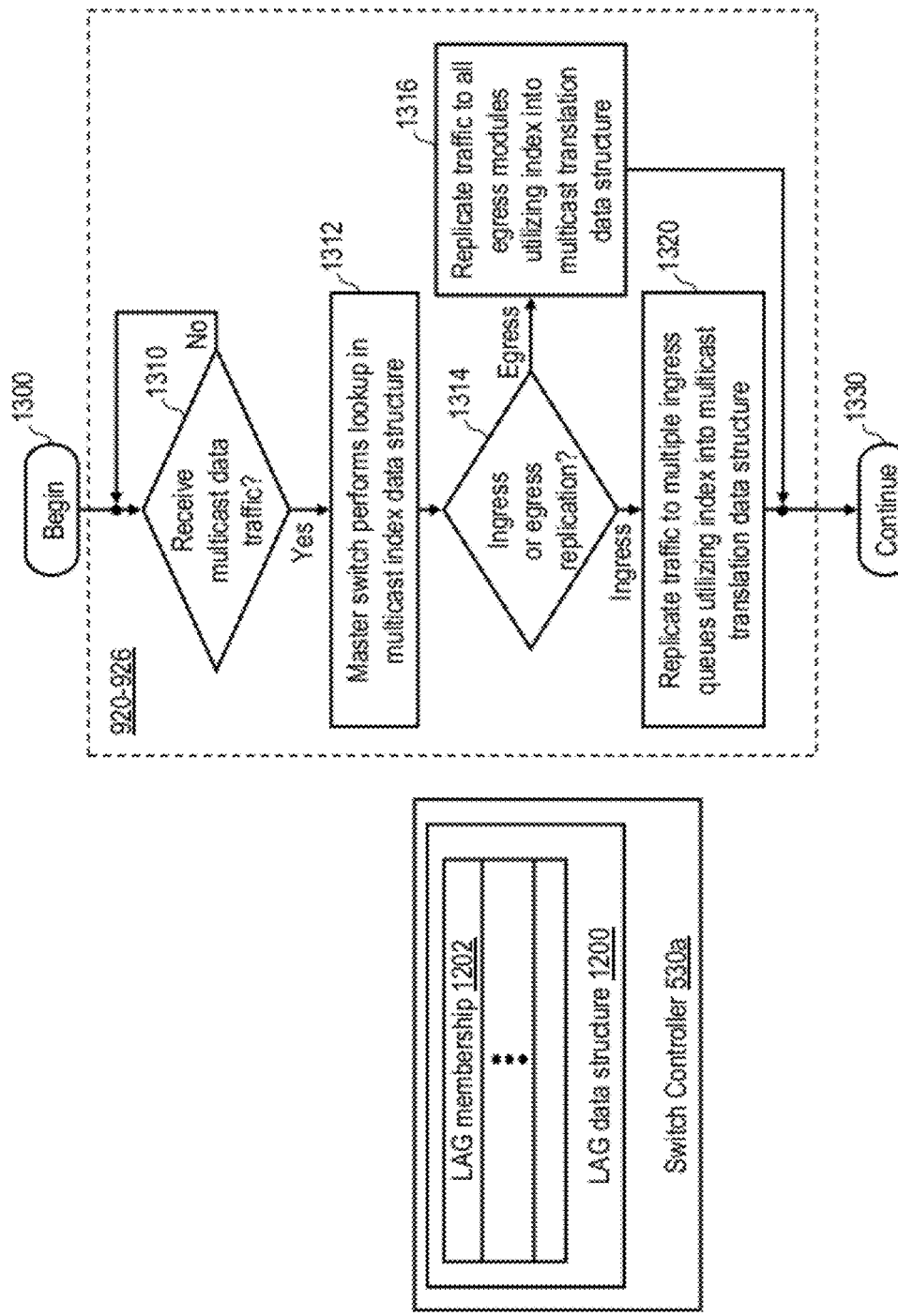

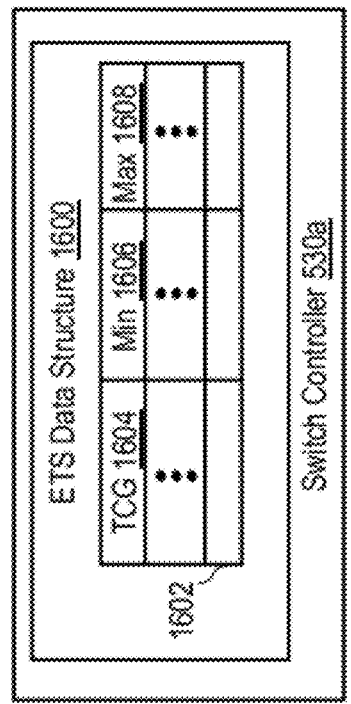
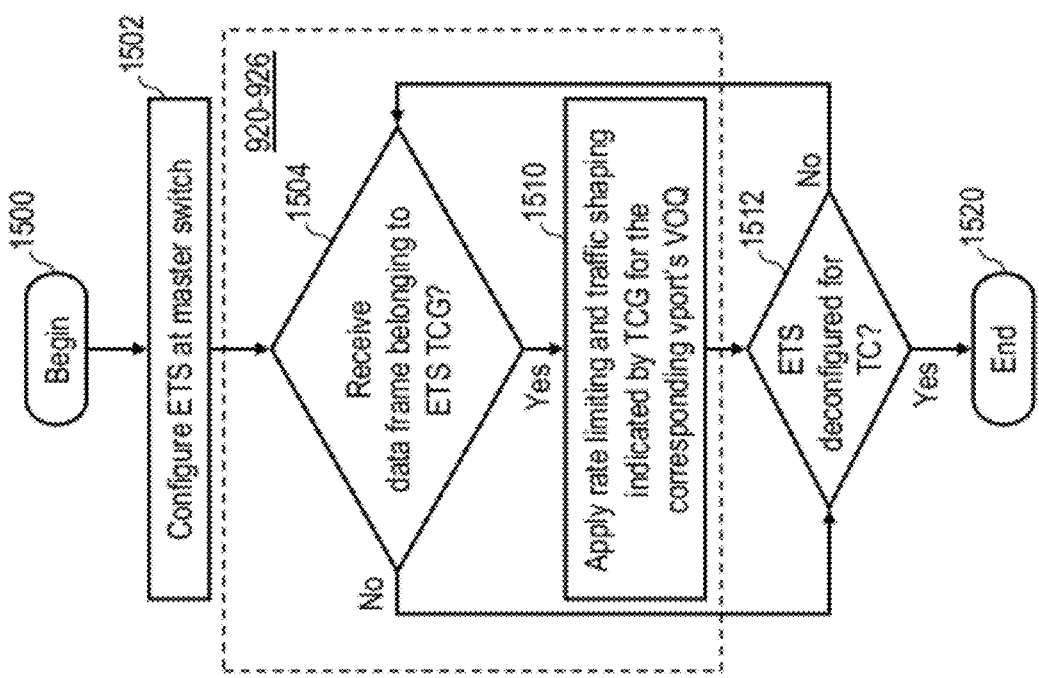
Figure 16
Figure 15

PRIORITY BASED FLOW CONTROL IN A DISTRIBUTED FABRIC PROTOCOL (DFP) SWITCHING NETWORK ARCHITECTURE

BACKGROUND OF THE INVENTION

1. Technical Field

The present invention relates in general to network communication and, in particular, to an improved switching network architecture for computer networks.

2. Description of the Related Art

As is known in the art, network communication is commonly premised on the well known seven layer Open Systems Interconnection (OSI) model, which defines the functions of various protocol layers while not specifying the layer protocols themselves. The seven layers, sometimes referred to herein as Layer 7 through Layer 1, are the application, presentation, session, transport, network, data link, and physical layers, respectively.

At a source station, data communication begins when data is received from a source process at the top (application) layer of the stack of functions. The data is sequentially formatted at each successively lower layer of the stack until a data frame of bits is obtained at the data link layer. Finally, at the physical layer, the data is transmitted in the form of electromagnetic signals toward a destination station via a network link. When received at the destination station, the transmitted data is passed up a corresponding stack of functions in the reverse order in which the data was processed at the source station, thus supplying the information to a receiving process at the destination station.

The principle of layered protocols, such as those supported by the OSI model, is that, while data traverses the model layers vertically, the layers at the source and destination stations interact in a peer-to-peer (i.e., Layer N to Layer N) manner, and the functions of each individual layer are performed without affecting the interface between the function of the individual layer and the protocol layers immediately above and below it. To achieve this effect, each layer of the protocol stack in the source station typically adds information (in the form of an encapsulated header) to the data generated by the sending process as the data descends the stack. At the destination station, these encapsulated headers are stripped off one-by-one as the data propagates up the layers of the stack until the decapsulated data is delivered to the receiving process.

The physical network coupling the source and destination stations may include any number of network nodes interconnected by one or more wired or wireless network links. The network nodes commonly include hosts (e.g., server computers, client computers, mobile devices, etc.) that produce and consume network traffic, switches, and routers. Conventional network switches interconnect different network segments and process and forward data at the data link layer (Layer 2) of the OSI model. Switches typically provide at least basic bridge functions, including filtering data traffic by Layer 2 Media Access Control (MAC) address, learning the source MAC addresses of frames, and forwarding frames based upon destination MAC addresses. Routers, which interconnect different networks at the network (Layer 3) of the OSI model, typically implement network services such as route processing, path determination and path switching.

A large network typically includes a large number of switches, which operate independently at the management, control and data planes. Consequently, each switch must be individually configured, implements independent control on data traffic (e.g., access control lists (ACLs)), and forwards data traffic independently of data traffic handled by any other of the switches.

SUMMARY OF THE INVENTION

In accordance with at least one embodiment, the management, control and data handling of a plurality of switches in a computer network is improved.

In at least one embodiment, a switching network includes an upper tier including a master switch and a lower tier including a plurality of lower tier entities. The master switch includes a plurality of ports each coupled to a respective one of the plurality of lower tier entities. Each of the plurality of ports includes a plurality of virtual ports each corresponding to a respective one of a plurality of remote physical interfaces (RPIs) at the lower tier entity coupled to that port. Each of the plurality of ports also includes a receive interface that, responsive to receipt of data traffic from a particular lower tier entity among the plurality of lower tier entities, queues the data traffic to the virtual port among the plurality of virtual ports that corresponds to the RPI on the particular lower tier entity that was the source of the data traffic. The master switch further includes a switch controller that switches data traffic from the virtual port to an egress port among the plurality of ports from which the data traffic is forwarded.

In at least one embodiment, a switching network includes an upper tier and a lower tier including a plurality of lower tier entities. A master switch in the upper tier, which has a plurality of ports each coupled to a respective lower tier entity, implements on each of the ports a plurality of virtual ports each corresponding to a respective one of a plurality of remote physical interfaces (RPIs) at the lower tier entity coupled to that port. Data traffic communicated between the master switch and RPIs is queued within virtual ports that correspond to the RPIs on lower tier entities with which the data traffic is communicated. The master switch enforces priority-based flow control (PFC) on data traffic of a given virtual port by transmitting, to a lower tier entity on which a corresponding RPI resides, a PFC data frame specifying priorities for at least two different classes of data traffic communicated by the particular RPI.

In at least one embodiment, a switching network includes an upper tier having a master switch and a lower tier including a plurality of lower tier entities. The master switch, which has a plurality of ports each coupled to a respective lower tier entity, implements on each of the ports a plurality of virtual ports each corresponding to a respective one of a plurality of remote physical interfaces (RPIs) at the lower tier entity coupled to that port. Data traffic communicated between the master switch and RPIs is queued within virtual ports that correspond to the RPIs with which the data traffic is communicated. The master switch applies data handling to the data traffic in accordance with a control policy based at least upon the virtual port in which the data traffic is queued, such that the master switch applies different policies to data traffic queued to two virtual ports on the same port of the master switch.

BRIEF DESCRIPTION OF THE DRAWINGS

FIG. 7 is a high level logical flowchart of an exemplary process for managing a DFP switching network in accordance with one embodiment;

FIG. 8 is depicted a high level logical flowchart of an exemplary process by which network traffic is forwarded from a lower tier to an upper tier of a DFP switching network configured to operate as a virtualized switch in accordance with one embodiment;

FIG. 12 depicts an exemplary embodiment of a LAG data structure utilized to record membership of a LAG in accordance with one embodiment;

FIG. 13 is a high level logical flowchart of an exemplary method of multicasting in a DFP switching network in accordance with one embodiment;

FIG. 15 is a high level logical flowchart of an exemplary method of enhanced transmission selection (ETS) in a DFP switching network in accordance with one embodiment;

FIG. 16 depicts an exemplary enhanced transmission selection (ETS) data structure that may be utilized to configure ETS for a master switch of a DFP switching network in accordance with one embodiment;

DETAILED DESCRIPTION OF ILLUSTRATIVE EMBODIMENT

Disclosed herein is a switching network architecture that imposes unified management, control and data planes on a plurality of interconnected switches in a computer network.

Figure 1:
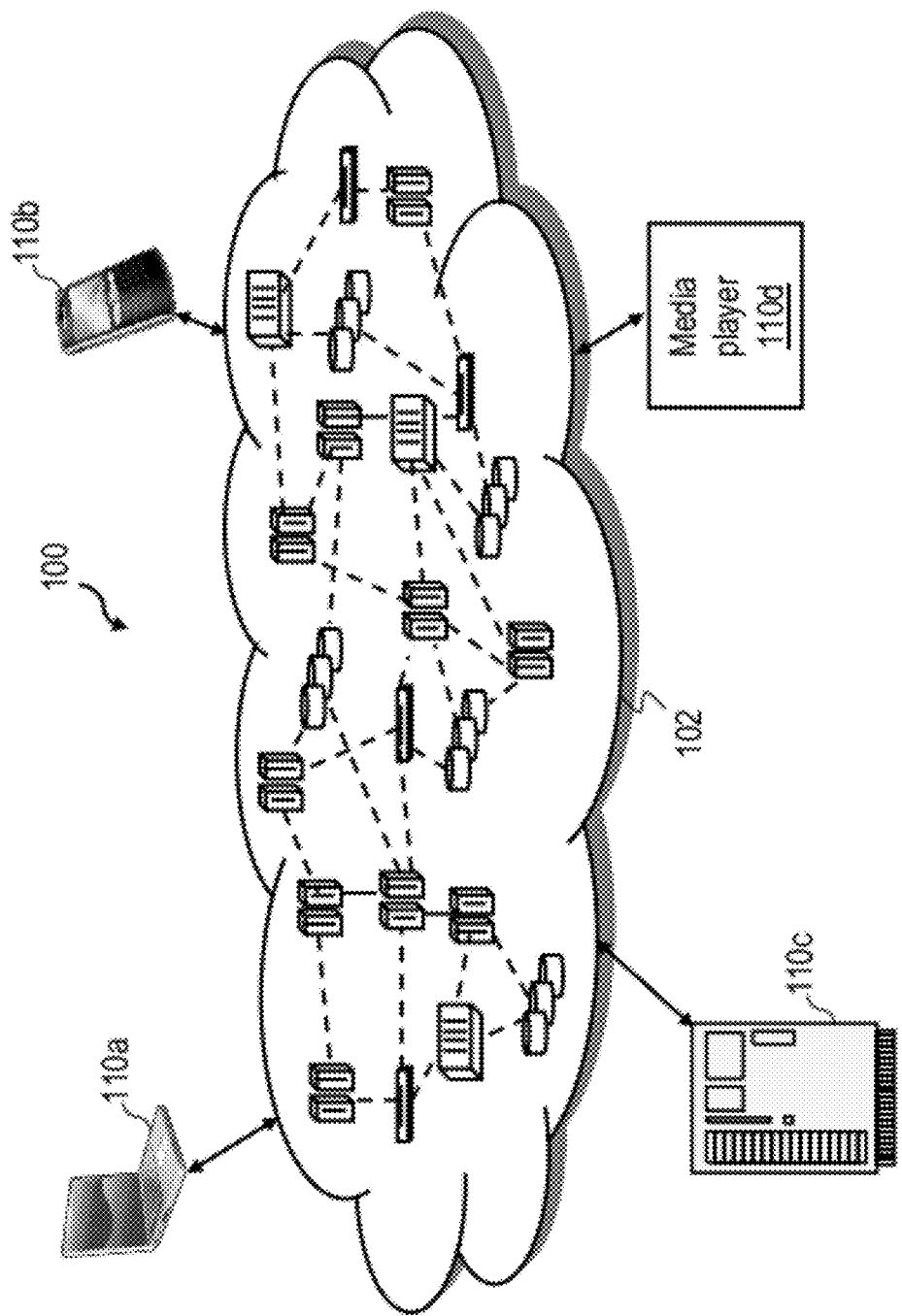
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100 includes a collection of resources 102. Resources 102, which may include various hosts, clients, switches, routers, storage, etc., are interconnected for communication and may be grouped (not shown) physically or virtually, in one or more public, private, community, public, or cloud networks or a combination thereof. In this manner, data processing environment 100 can offer infrastructure, platforms, software and/or services accessible to various client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and accessing resources 102 via a packet network.

Figure 2:
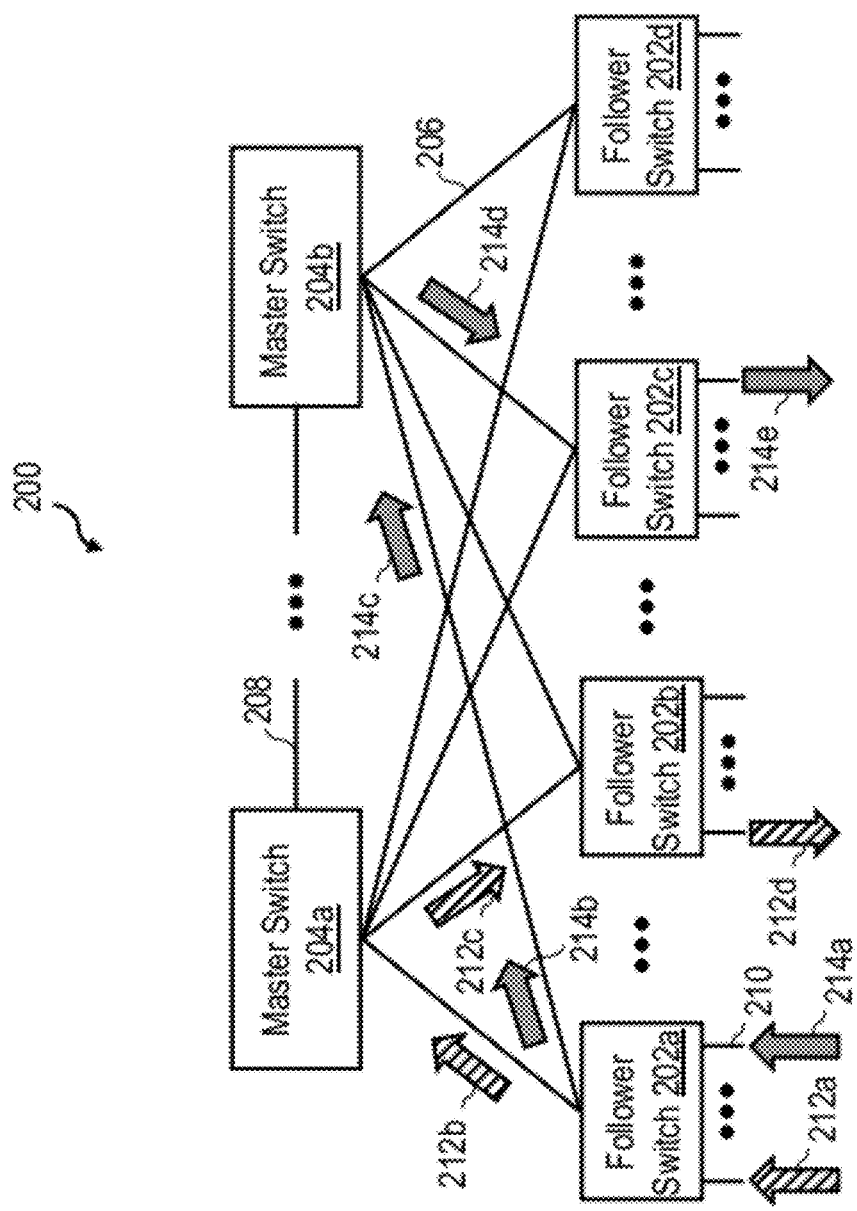
FIG. 2 is a high level block diagram of one embodiment of a distributed fabric protocol (DFP) switching network architecture that can be implemented within the data processing environment of FIG. 1.

Referring now to FIG. 2, there is illustrated a high level block diagram of an exemplary distributed fabric protocol (DFP) switching network architecture that may be implemented within resources 102 in accordance with one embodiment. In the illustrated exemplary embodiment, resources 102 include a plurality of physical and/or virtual network switches forming a DFP switching network 200. In contrast to conventional network environments in which each switch implements independent management, control and data planes, DFP switching network 200 implements unified management, control and data planes, enabling all the constituent switches to be viewed as a unified virtualized switch, thus simplifying deployment, configuration, and management of the network fabric.

DFP switching network 200 includes two or more tiers of switches, which in the instant embodiment includes a lower tier having a plurality of follower switches, including follower switches 202a-202d, and an upper tier having a plurality of master switches, including master switches 204a-204b. In an embodiment with two tiers as shown, a port of each master switch 204 is directly connected by one of inter-tier links 206 to one of the ports of each follower switch 202, and a port of each master switch 204 is coupled directly or indirectly to a port at least one other master switch 204 by a master link 208. When such distinctions are relevant, ports supporting switch-to-switch communication via inter-tier links 206 are referred to herein as "inter-switch ports," and other ports (e.g., of follower switch 202a-202d) are referred to as "data ports."

In a preferred embodiment, follower switches 202 are configured to operate on the data plane in a pass-through mode, meaning that all ingress data traffic received at data ports 210 of follower switches 202 (e.g., from hosts) is forwarded by follower switches 202 via inter-switch ports and inter-tier links 206 to one of master switches 204. Master switches 204 in turn serve as the fabric for the data traffic (hence the notion of a distributed fabric) and implement all packet switching and routing for the data traffic. With this arrangement data traffic may be forwarded, for example, in the first exemplary flow indicated by arrows 212a-212d and the second exemplary flow indicated by arrows 214a-214e.

As will be appreciated, the centralization of switching and routing for follower switches 202 in master switches 204 implies that master switches 204 have knowledge of the ingress data ports of follower switches 202 on which data traffic was received. In a preferred embodiment, switch-to-switch communication via links 206, 208 employs a Layer 2 protocol, such as the Inter-Switch Link (ISL) protocol developed by Cisco Corporation or IEEE 802.1QnQ, that utilizes explicit tagging to establish multiple Layer 2 virtual local area networks (VLANs) over DFP switching network 200. Each follower switch 202 preferably applies VLAN tags (also known as service tags (S-tags)) to data frames to communicate to the recipient master switch 204 the ingress data port 210 on the follower switch 202 on which the data frame was received. In alternative embodiments, the ingress data port can be communicated by another identifier, for example, a MAC-in-MAC header, a unique MAC address, an IP-in-IP header, etc. As discussed further below, each data port 210 on each follower switch 202 has a corresponding virtual port (or vport) on each master switch 204, and data frames ingressing on the data port 210 of a follower switch 202 are handled as if ingressing on the corresponding vport of the recipient master switch 204.

Figure 3:
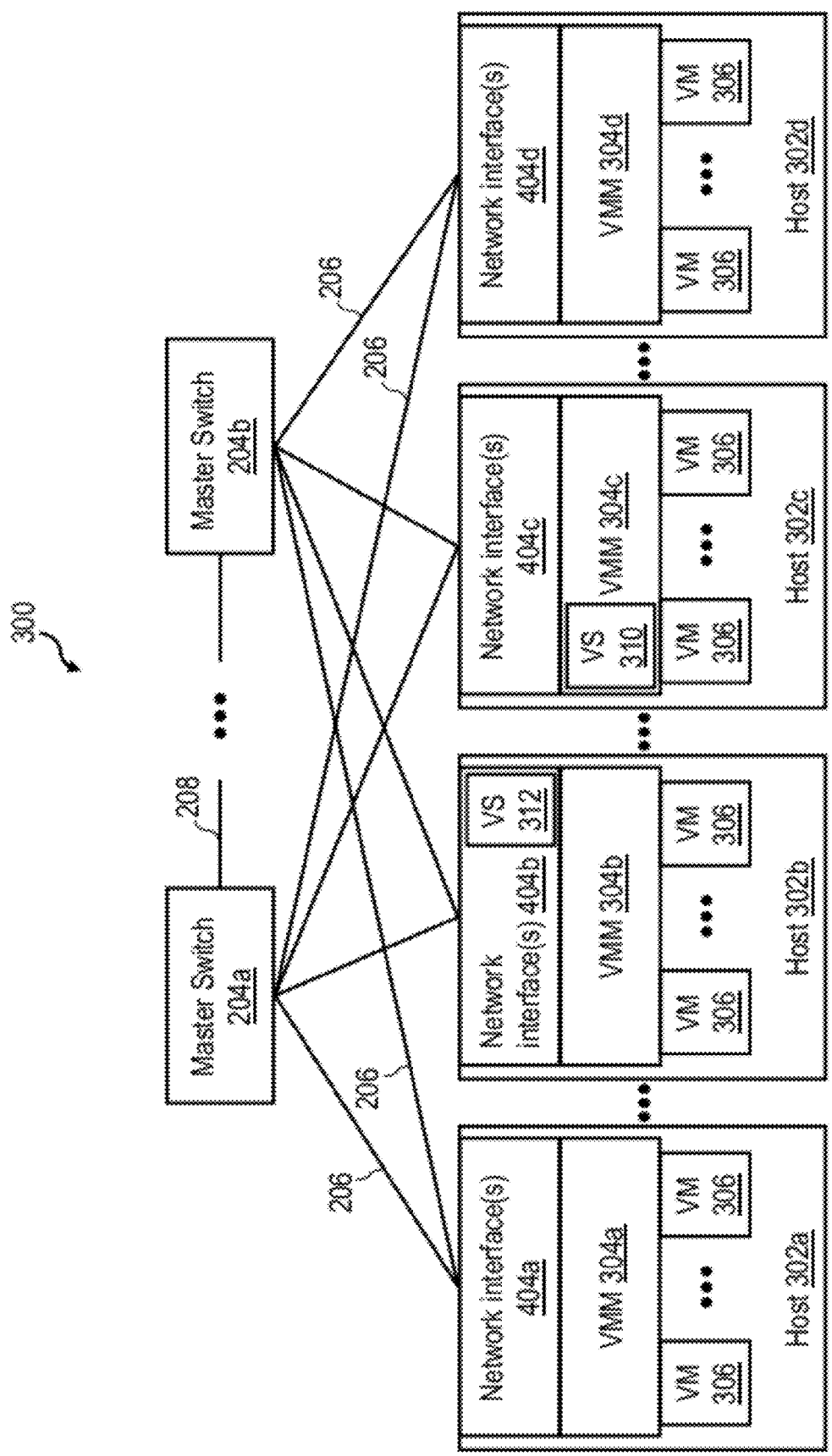
FIG. 3 is a high level block diagram of another embodiment of a DFP switching network architecture that can be implemented within the data processing environment of FIG. 1.

With reference now to FIG. 3, there is illustrated an a high level block diagram of another exemplary distributed fabric protocol (DFP) switching network architecture that may be implemented within resources 102 in accordance with one embodiment. The DFP architecture shown in FIG. 3, which implements unified management, control and data planes across a DFP switching network 300, may be implemented within resources 102 as an alternative to or in addition to DFP switching network architecture depicted in FIG. 2.

Figure 4:
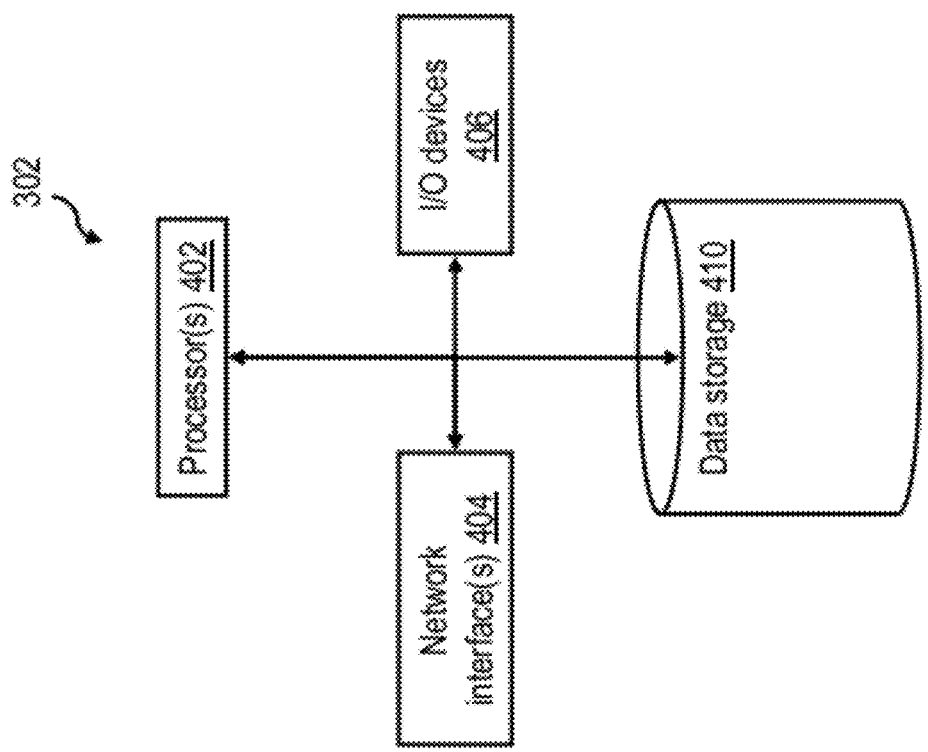
FIG. 4 is a more detailed block diagram of a host in FIG. 3 in accordance with one embodiment.

In the illustrated exemplary embodiment, the resources 102 within DFP switching network 300 include one or more physical and/or virtual network switches implementing at least one of master switches 204a-204b in an upper tier. Switching network 300 additionally includes at a lower tier a plurality of physical hosts 302a-302d. As depicted in FIG. 4, in an exemplary embodiment, each host 302 includes one or more network interfaces 404 (e.g., network interface cards (NICs), converged network adapters (CNAs), etc.) that provides an interface by which that host 302 communicates with master switch(es) 204. Host 302 additionally includes one or more processors 402 (typically comprising one or more integrated circuits) that process data and program code, for example, to manage, access and manipulate data or software in data processing environment 100. Host 302 also includes input/output (I/O) devices 406, such as ports, displays, user input devices and attached devices, etc., which receive inputs and provide outputs of the processing performed by host 302 and/or other resource(s) in data processing environment 100. Finally, host 302 includes data storage 410, which may include one or more volatile or non-volatile storage devices, including memories, solid state drives, optical or magnetic disk drives, tape drives, etc. Data storage 410 may store, for example, program code (including software, firmware or a combination thereof) and data.

Returning to FIG. 3, the program code executed by each host 302 includes a virtual machine monitor (VMM) 304 (also referred to as a hypervisor) which virtualizes and manages the resources of its respective physical host 302. Each VMM 304 allocates resources to, and supports the execution of one or more virtual machines (VMs) 306 in one or more possibly heterogeneous operating system partitions. Each of VMs 304 may have one (and in some cases multiple) virtual network interfaces (virtual NICs (VNICs)) providing network connectivity at least at Layers 2 and 3 of the OSI model.

As depicted, one or more of VMMs 304a-304d may optionally provide one or more virtual switches (VSs) 310 (e.g., Fibre Channel switch(es), Ethernet switch(es), Fibre Channel over Ethernet (FCoE) switches, etc.) to which VMs 306 can attach. Similarly, one or more of the network interfaces 404 of hosts 302 may optionally provide one or more virtual switches (VSs) 312 (e.g., Fibre Channel switch(es), Ethernet switch(es), FCoE switches, etc.) to which VMs 306 may connect. Thus, VMs 306 are in network communication with master switch(es) 204 via inter-tier links 206, network interfaces 404, the virtualization layer provided by VMMs 304, and optionally, one or more virtual switches 310, 312 implemented in program code and/or hardware.

As in FIG. 2, virtual switches 310, 312, if present, are preferably configured to operate on the data plane in a pass-through mode, meaning that all ingress data traffic received from VMs 306 at the virtual data ports of virtual switches 310, 312 is forwarded by virtual switches 310, 312 via network interfaces 404 and inter-tier links 206 to one of master switches 204. Master switches 204 in turn serve as the fabric for the data traffic and implement all switching and routing for the data traffic.

As discussed above, the centralization of switching and routing for hosts 302 in master switch(es) 204 implies that the master switch 204 receiving data traffic from a host 302 has knowledge of the source of the data traffic (e.g., link aggregation group (LAG) interface, physical port, virtual port, etc.). Again, to permit communication of such traffic source information, communication via inter-tier links 206 preferably utilizes a Layer 2 protocol, such as the Inter-Switch Link (ISL) protocol developed by Cisco Corporation or IEEE 802.1QnQ, that includes explicit tagging to establish multiple Layer 2 virtual local area networks (VLANs) over DFP switching network 300. Each host 302 preferably applies VLAN tags to data frames to communicate to the recipient master switch 204 the data traffic source (e.g., physical port, LAG interface, virtual port (e.g., VM virtual network interface card (VNIC), Single Root I/O Virtualization (SR-IOV) NIC partition, or FCoE port), etc.) from which the data frame was received. Each such data traffic source has a corresponding vport on each master switch 204, and data frames originating at a data traffic source on a host 302 are handled as if ingressing on the corresponding vport of the recipient master switch 204. For generality, data traffic sources on hosts 302 and data ports 210 on follower switches 202 will hereafter be referred to as remote physical interfaces (RPIs) unless some distinction is intended between the various types of RPIs.

In DFP switching networks 200 and 300, load balancing can be achieved through configuration of follower switches 202 and/or hosts 302. For example, in one possible embodiment of a static configuration, data traffic can be divided between master switches 204 based on the source RPI. In this exemplary embodiment, if two master switches 204 are deployed, each follower switch 202 or host 302 can be configured to implement two static RPI groups each containing half of the total number of its RPIs and then transmit traffic of each of the RPI groups to a different one of the two master switches 204. Similarly, if four master switches 204 are deployed, each follower switch 202 or host 302 can be configured to implement four static RPI groups each containing one-fourth of the total number of its RPIs and then transmit traffic of each of the RPI groups to a different one of the four master switches 204.

Figure 5A:
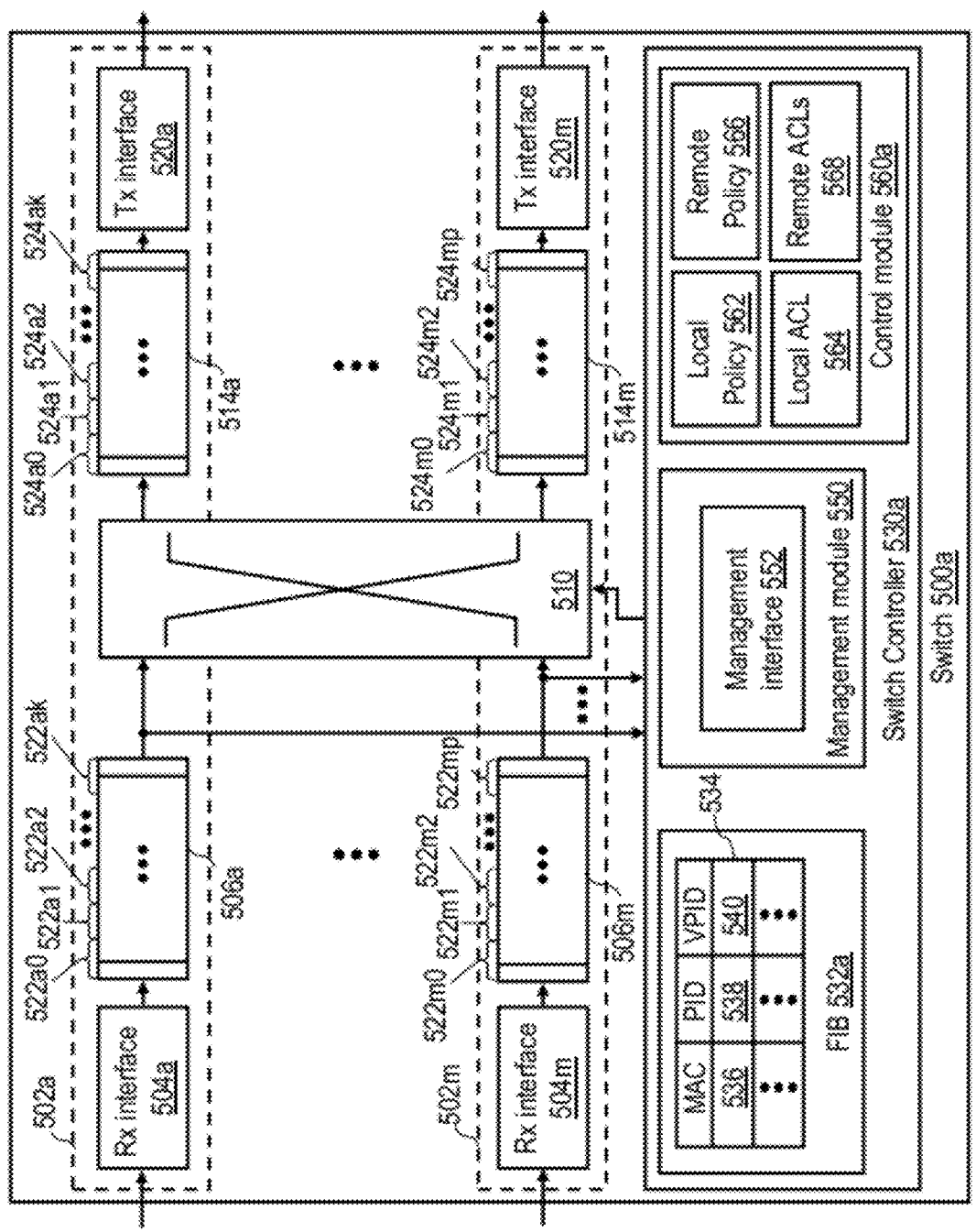
FIG. 5A is a high level block diagram of an exemplary embodiment of a master switch of a DFP switching network in accordance with one embodiment.

With reference now to FIG. 5A, there is illustrated a high level block diagram of an exemplary embodiment of a switch 500a, which may be utilized to implement any of the master switches 204 of FIGS. 2-3.

As shown, switch 500a includes a plurality of physical ports 502a-502m. Each port 502 includes a respective one of a plurality of receive (Rx) interfaces 504a-504m and a respective one of a plurality of ingress queues 506a-506m that buffers data frames received by the associated Rx interface 504. Each of ports 502a-502m further includes a respective one of a plurality of egress queues 514a-514m and a respective one of a plurality of transmit (Tx) interfaces 520a-520m that transmit data frames from an associated egress queue 514.

In one embodiment, each of the ingress queues 506 and egress queues 514 of each port 502 is configured to provide multiple (e.g., eight) queue entries per RPI in the lower tier of the DFP switching network 200, 300 from which ingress data traffic can be received on that port 502. The group of multiple queue entries within a master switch 204 defined for a lower tier RPI is defined herein as a virtual port (vport), with each queue entry in the vport corresponding to a VOQ. For example, for a DFP switching network 200 as depicted in FIG. 2, port 502a of switch 500a is configured to implement, for each of k+1 data ports 210 of the follower switch 202 connected to port 502a, a respective one of ingress vports 522a0-522ak and a respective one of egress vports 524a0-524ak. If switch 500a is implemented in a DFP switching network 300 as illustrated in FIG. 3, port 502a is configured to implement a respective vport 522 for each of k+1 data traffic sources in the host 302 connected to port 502a by an inter-tier link 206. Similarly, for a DFP switching network 200 as depicted in FIG. 2, port 502m of switch 500a is configured to implement, for each of p+1 data ports 210 of a follower switch 202 connected to port 502m, a respective one of ingress vports 522m0-522mp and a respective one of egress vports 524m0-524mp. If switch 500a is implemented in a DFP switching network 300 as illustrated in FIG. 3, port 502a implements a respective vport 522 for each of k data traffic sources in the host 302 connected to port 502a by an inter-tier link 206. As will be appreciated the number of ingress vports implemented on each of ports 502 may differ depending upon the number of RPIs on the particular lower tier entity (e.g., follower switch 202 or host 302) connected to each of ports 502. Thus, each RPI at the lower tier of a DFP switching network 200 or 300 is mapped to a set of ingress and egress vports 522, 524 on a physical port 502 of each master switch 204, and when data frames from that RPI are received on the physical port 502, the receive interface 504 of port 502 can direct the data frames to the appropriate ingress vport 522 based on an RPI identifier in the data traffic.

Master switch 204 can create, destroy, disable or migrate vports 522, 524 across its physical ports 502 as needed depending, for example, on the connection state with the lower tier entities 202, 302. For example, if a follower switch 202 is replaced by a replacement follower switch 202 with a greater number of ports, master switches 204 will automatically create additional vports 522, 524 on the relevant physical port 502 in order to accommodate the additional RPIs on the replacement follower switch 202. Similarly, if a VM 306 running on a host 302 connected to a first physical port of a master switch 204 migrates to a different host 302 connected to a different second physical port of the master switch 204 (i.e., the migration remains within the switch domain), the master switch 204 will automatically migrate the vports 522, 524 corresponding to the VM 306 from the first physical port 502 of the master switch 204 to the second physical port 502 of the master switch 204. If the VM 306 completes its migration within a predetermined flush interval, data traffic for the VM 306 can be remarked by switch controller 530a and forwarded to the egress vport 524 on the second physical port 502. In this manner, the migration of the VM 306 can be accomplished without traffic interruption or loss of data traffic, which is particularly advantageous for loss-sensitive protocols.

Each master switch 204 additionally detects loss of an inter-switch link 206 to a lower tier entity (e.g., the link state changes from up to down, inter-switch link 206 is disconnected, or lower tier entity fails). If loss of an inter-switch link 206 is detected, the master switch 204 will automatically disable the associated vports 522, 524 until restoration of the inter-switch link 206 is detected. If the inter-switch link 206 is not restored within a predetermined flush interval, master switch 204 will destroy the vports 522, 524 associated with the lower tier entity with which communication has been lost in order to recover the queue capacity. During the flush interval, switch controller 530a permits data traffic destined for a disabled egress vport 524 to be buffered on the ingress side. If the inter-switch link 206 is restored and the disabled egress vport 524 is re-enabled, the buffered data traffic can be forwarded to the egress vport 524 within loss.

Switch 500a additionally includes a crossbar 510 that is operable to intelligently switch data frames from any of ingress queues 506a-506m to any of egress queues 514a-514m (and thus between any ingress vport 522 and any egress vport 524) under the direction of switch controller 530a. As will be appreciated, switch controller 530a can be implemented with one or more centralized or distributed, special-purpose or general-purpose processing elements or logic devices, which may implement control entirely in hardware, or more commonly, through the execution of firmware and/or software by a processing element.

In order to intelligently switch data frames, switch controller 530a builds and maintains one or more data plane data structures, for example, a forwarding information base (FIB) 532a, which is commonly implemented as a forwarding table in content-addressable memory (CAM). In the depicted example, FIB 532a includes a plurality of entries 534, which may include, for example, a MAC field 536, a port identifier (PID) field 538 and a virtual port (vport) identifier (VPID) field 540. Each entry 534 thus associates a destination MAC address of a data frame with a particular vport 520 on a particular egress port 502 for the data frame. Switch controller 530a builds FIB 332a in an automated manner by learning from observed data frames an association between ports 502 and vports 520 and destination MAC addresses specified by the data frames and recording the learned associations in FIB 532a. Switch controller 530a thereafter controls crossbar 510 to switch data frames in accordance with the associations recorded in FIB 532a. Thus, each master switch 204 manages and accesses its Layer 2 and Layer 3 QoS, ACL and other management data structures per vport corresponding to RPIs at the lower tier.

Switch controller 530a additionally implements a management module 550 that serves as the management and control center for the unified virtualized switch. In one embodiment, each master switch 204 includes management module 350, but the management module 350 of only a single master switch 204 (referred to herein as the managing master switch 204) of a given DFP switching network 200 or 300 is operative at any one time. In the event of a failure of the master switch 204 then serving as the managing master switch 204 (e.g., as detected by the loss of heartbeat messaging by the managing master switch 204 via a master link 208), another master switch 204, which may be predetermined or elected from among the remaining operative master switches 204, preferably automatically assumes the role of the managing master switch 204 and utilizes its management module 350 to provide centralized management and control of the DFP switching network 200 or 300.

Figure 6:
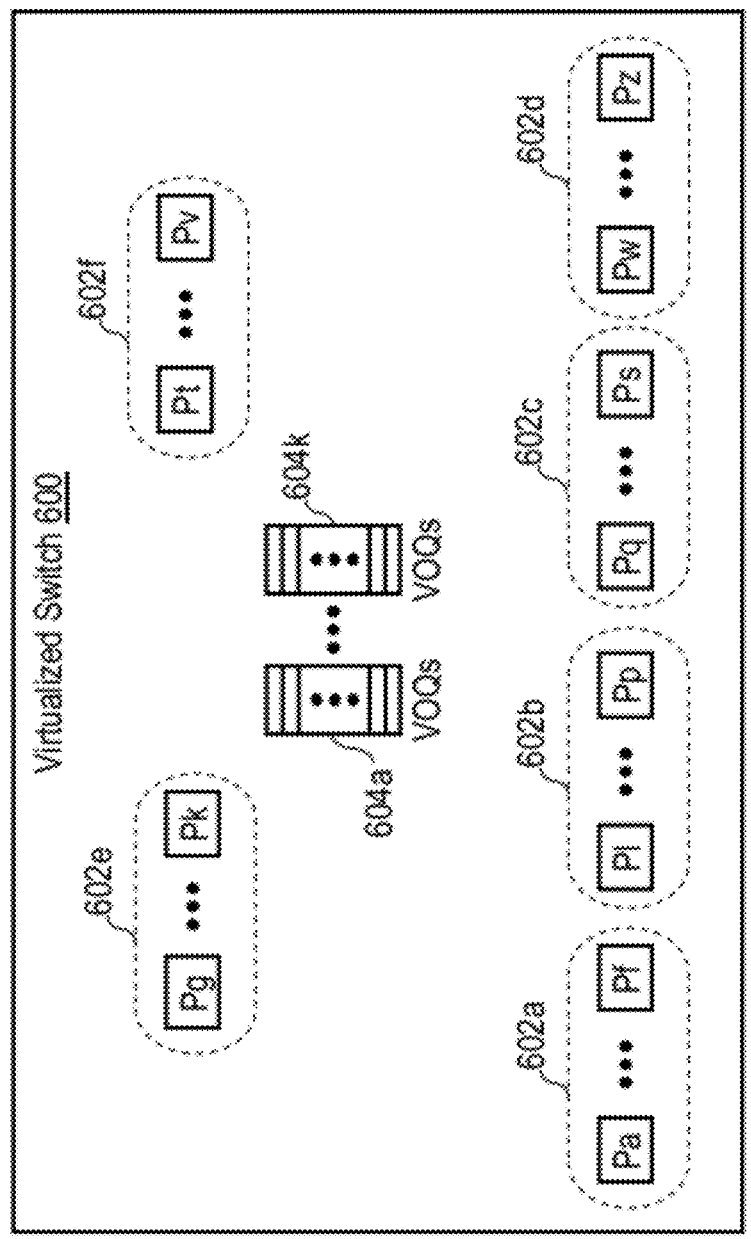
FIG. 6 is a view of the DFP switching network architecture of FIG. 2 or FIG. 3 presented as a virtualized switch via a management interface in accordance with one embodiment.

Management module 550 preferably includes a management interface 552, for example, an XML or HTML interface accessible to an administrator stationed at a network-connected administrator console (e.g., one of clients 110a-110c) in response to login and entry of administrative credentials. Management module 550 preferably presents via management interface 552 a global view of all ports residing on all switches (e.g., switches 204 and/or 202) in a DFP switching network 200 or 300. For example, FIG. 6 is a view of DFP switching network 200 of FIG. 2 presented as a virtualized switch 600 via management interface 552 in accordance with one embodiment. In this embodiment, master switch 204 can be considered a virtual switching chassis, with the follower switches 202 serving a virtual line cards. In this example, virtualized switch 600, which can be, for example, graphically and/or tabularly represented in a display of the administrator console, presents virtualized ports (Pa-Pf) 602a corresponding to the data ports and inter-switch ports of follower switch 202a, Pl-Pp 602b corresponding to the data ports and inter-switch ports of follower switch 202b, Pq-Ps 602c corresponding to the data ports and inter-switch ports of follower switch 202c, and Pw-Pz 602d corresponding to the data ports and inter-switch ports of follower switch 202d. In addition, virtualized switch 600 represents by Pg-Pk 602e the inter-switch ports of master switch 204a, and represents by Pt-Pv 602f the inter-switch ports of master switch 204b. Further, virtualized switch 600 represents each vport 522, 524 implemented on a master switch 204 with a respective set of virtual output queues (VOQs) 604. For example, each of vports 522, 524 implemented on master switches 204a, 204b is represented by a respective one of VOQ sets 604a-604k. By interacting with virtualized switch 600, the administrator can manage and establish (e.g., via graphical, textual, numeric and/or other inputs) desired control for one or more (or all) ports or vports of one or more (or all) of follower switches 202 and master switches 204 in DFP switching network 200 via a unified interface. It should be noted that the implementation of sets of VOQs 604a-604k within virtualized switch 600 in addition to virtualized ports Pa-Pf 602a, Pl-Pp 602b, Pq-Ps 602c and Pw-Pz 602d enables the implementation of individualized control for data traffic of each RPI (and of each traffic classification of the data traffic of the RPI) at either tier (or both tiers) of a DFP switching network 200 or 300. Thus, as discussed further below, an administrator can implement a desired control for a specific traffic classification of a particular data port 210 of follower switch 202a via interacting with virtualized port Pa of virtualized switch 600. Alternatively or additionally, the administrator can establish a desired control for that traffic classification for that data port 210 by interacting with a particular VOQ corresponding to that traffic classification on the VOQ set 604 representing the ingress vport 522 or egress vport 524 corresponding to the data port 210.

Returning to FIG. 5A, switch controller 530a further includes a control module 560a that can be utilized to implement desired control for data frames traversing a DFP switching network 200 or 300. Control module 560a includes a local policy module 562 that implements a desired suite of control policies for switch 500a at ingress and/or egress on a per-vport basis. Control module 560 may further include a local access control list (ACL) 564 that restricts ingress access to switch 500a on a per-vport basis. The managing master switch 204 may optionally further include a remote policy module 566 and remote ACL 568, which implement a desired suite of control policies and access control on one or more of follower switches 202 or virtual switches 310, 312 upon ingress and/or egress on a per-data port basis. The managing master switch 204 can advantageously push newly added or updated control information (e.g., a control policy or ACL) for another master switch 204, follower switch 202 or virtual switch 310, 312 to the target switch via a reserved management VLAN. Thus, ACLs, control policies and other control information for traffic passing through the virtualized switch can be enforced by master switches 204 at the vports 522, 524 of the master switches 204, by follower switches 202 at data ports 210, and/or at the virtual ports of virtual switches 310, 312.

The capability to globally implement policy and access control at one or more desired locations within a DFP switching network 200 or 300 facilitates a number of management features. For example, to achieve a desired load balancing among master switches 204, homogeneous or heterogeneous control policies can be implemented by follower switches 202 and/or virtual switches 310, 312, achieving a desired distribution of the data traffic passing to the master switch(es) 204 for switching and routing. In one particular implementation, the load distribution can be made in accordance with the various traffic types, with different communication protocols run on different master switches 204. Follower switches 202 and hosts 302 connected to master switches 204 can thus implement a desired load distribution by directing protocol data units (PDUs) of each of a plurality of diverse traffic types to the master switch 204 responsible for that protocol.

Although not explicitly illustrated in FIG. 5A, it should be appreciated that in at least some embodiments, switch controller 530a may, in addition to Layer 2 frame switching, additionally implement routing and other packet processing at Layer 3 (and above) as is known in the art. In such cases, switch controller 530a can include a routing information base (RIB) that associates routes with Layer 3 addresses.

Figure 5B:
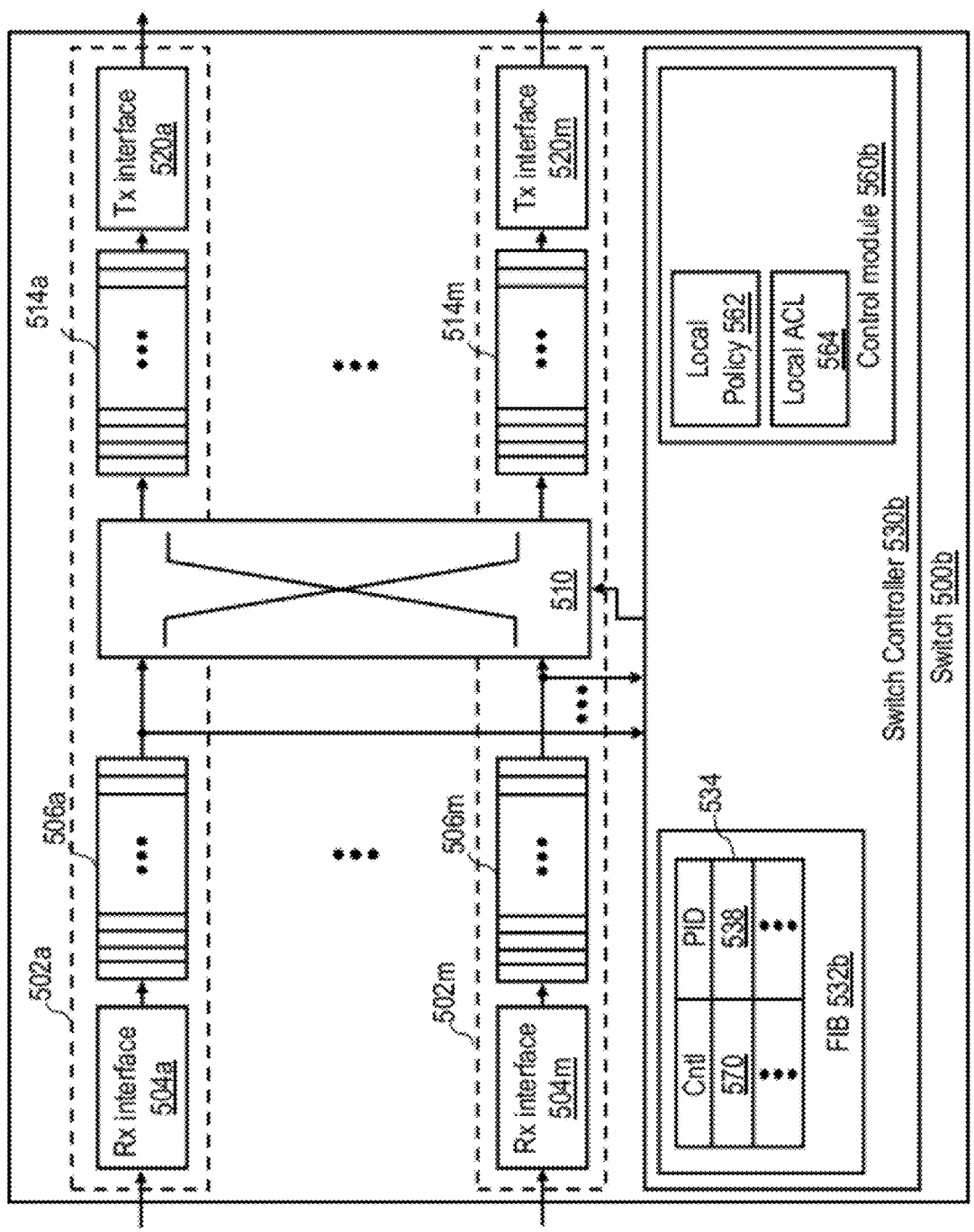
FIG. 5B is a high level block diagram of an exemplary embodiment of a follower switch of a DFP switching network in accordance with one embodiment.

Referring now to FIG. 5B, there is depicted a high level block diagram of an exemplary embodiment of a switch 500b, which may be utilized to implement any of the follower switches 202 of FIG. 2. As indicated by like reference numerals, switch 500b may be structured similarly to switch 500a, with a plurality of ports 502a-502m, a switch controller 530b, and a crossbar switch 510 controlled by switch controller 530b. However, because switch 500b is intended to operate in a pass-through mode that leaves the ultimate responsibility for forwarding frames with master switches 204, switch controller 530b is simplified. For example, in the illustrated embodiment, each entry 534 of FIB 332b includes a control field 570 for identifying values for one or more frame fields (e.g., destination MAC address, RPI, etc.) utilized to classify the frames (where the frame classifications are pushed to switch controller 530b by management module 350) and an associated PID field 538 identifying the egress data port 502 of switch 530b that is connected to a master switch 204 for forwarding that classification of data traffic. Control module 560 is similarly simplified, as no remote policy 566 or remote ACLs 568 are supported. Finally, management module 550 can be entirely omitted, as switch 500b need not be equipped to serve as a master switch 204.

With reference now to FIG. 7, there is illustrated a high level logical flowchart of an exemplary process for managing a DFP switching network in accordance with one embodiment. For convenience, the process of FIG. 7 is described with reference to DFP switching networks 200 and 300 of FIGS. 2-3. As with the other logical flowcharts illustrated herein, steps are illustrated in logical rather than strictly chronological order, and at least some steps can be performed in a different order than illustrated or concurrently.

The process begins at block 700 and then proceeds to block 702, which depicts each of master switches 204a, 204b learning the membership and topology of the DFP switching network 200 or 300 in which it is located. In various embodiments, master switches 204a, 204b may learn the topology and membership of a DFP switching network 200 or 300, for example, by receiving a configuration from a network administrator stationed at one of client devices 110a-110c, or alternatively, through implementation of an automated switch discovery protocol by the switch controller 530a of each of master switches 204a, 204b. Based upon the discovered membership in a DFP switching network 200 or 300, the switch controller 530a of each of master switches 204 implements, on each port 502, a respective ingress vport 522 and a respective egress vport 524 for each RPI in the lower tier of the DFP switching network 200, 300 from which ingress data traffic can be received on that port 502 (block 704). The managing master switch 204, for example, master switch 204a, thereafter permits configuration, management and control of DFP switching network 200 or 300 as a virtualized switch 600 through management interface 552 (block 706). It should be appreciated that as a virtualized switch 600, DFP switching network 200 or 300 can be configured, managed and controlled to operate as if all the virtualized ports 602 of virtualized switch 600 were within a single physical switch. Thus, for example, port mirroring, port trunking, multicasting, enhanced transmission selection (ETS) (e.g., rate limiting and shaping in accordance with draft standard IEEE 802.1 Qaz), and priority based flow control can be implemented for virtualized ports 602 regardless of the switches 202, 310, 312 or hosts 302 to which the corresponding RPIs belong. Thereafter, the management module 550 of the switch controller 530a of the managing master switch (e.g., master switch 204a) pushes control information to other master switches 204, follower switches 202 and/or virtual switches 310, 312 in order to property configure the control module 560 and FIB 532 of the other switches (block 708). The process of FIG. 7 thereafter ends at block 710.

Referring now to FIG. 8, there is depicted a high level logical flowchart of an exemplary process by which network traffic is forwarded from a lower tier to an upper tier of a DFP switching network configured to operate as a virtualized switch in accordance with one embodiment. For convenience, the process of FIG. 8 is also described with reference to DFP switching network 200 of FIG. 2 and DFP switching network 300 of FIG. 3.

The depicted process begins at block 800 and thereafter proceeds to block 802, which depicts an RPI at the lower tier of the DFP switching network receiving a data frame to be transmitted to a master switch 204. As indicated by dashed line illustration at block 804, the follower switch 202 or host 302 at which the RPI is located may optionally enforce policy control or access control (by reference to an ACL) to the data frame, if previously instructed to do so by the managing master switch 204.

At block 806, the follower switch 202 or host 302 at the lower tier applies an RPI identifier (e.g., an S-tag) to the data frame to identify the ingress RPI at which the data frame was received. The follower switch 202 or host 302 at the lower tier then forwards the data frame to a master switch 204 in the upper tier of the DFP switching network 200 or 300 (block 808). In the case of a follower switch 202, the data frame is forwarded at block 808 via the inter-switch egress port indicated by the FIB 532b. Thereafter, the process depicted in FIG. 8 ends at block 810.

Figure 9:
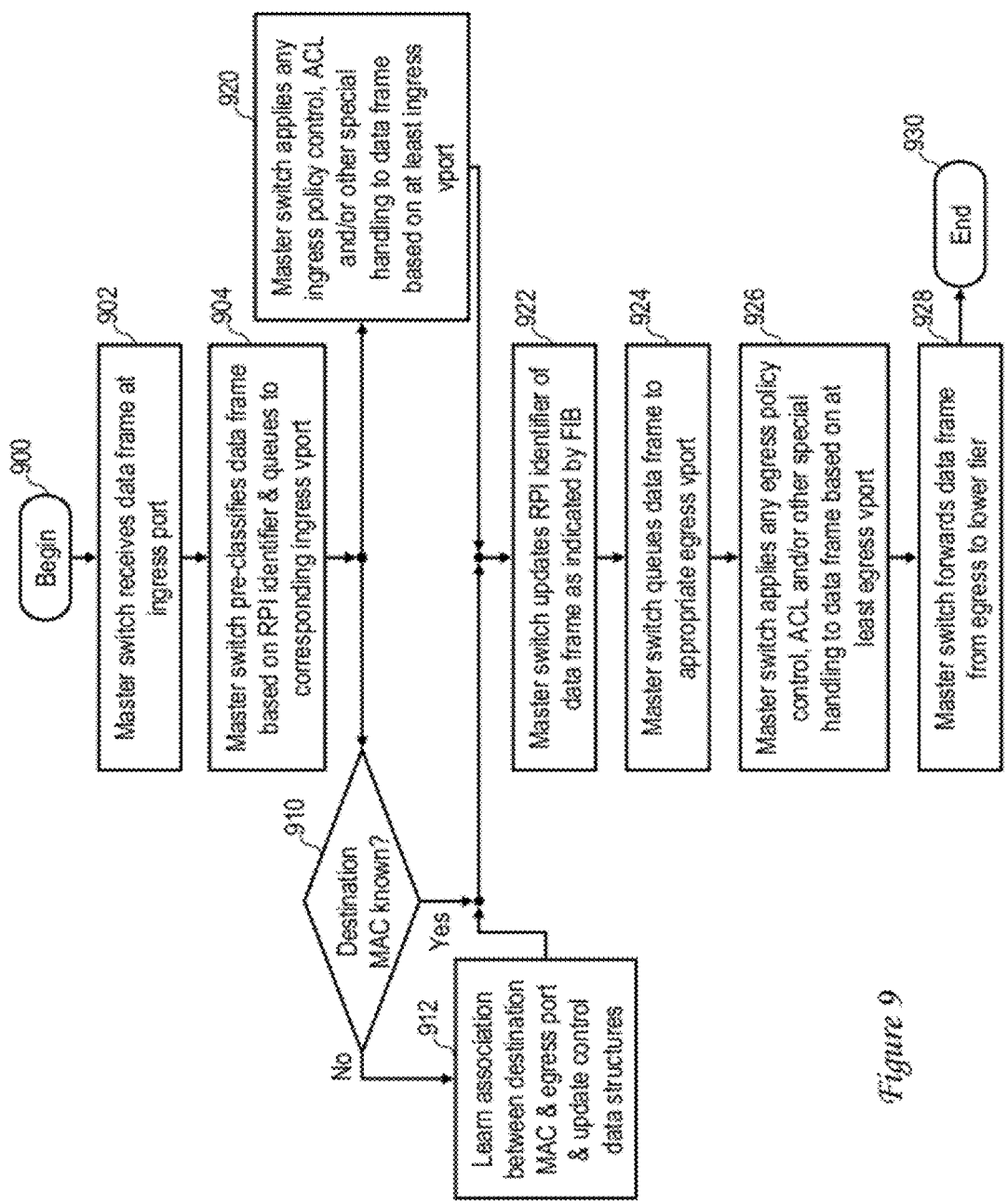
FIG. 9 is a high level logical flowchart of an exemplary process by which a master switch at the upper tier handles a data frame received from the lower tier of a DFP switching network in accordance with one embodiment.

With reference to FIG. 9, there is illustrated a high level logical flowchart of an exemplary process by which a master switch at the upper tier handles a data frame received from the lower tier of a DFP switching network in accordance with one embodiment. The illustrated process begins at block 900 and then proceeds to block 902, which depicts a master switch 204 of a DFP switching network 200 or 300 receiving a data frame from a follower switch 202 or host 302 on one of its ports 502. In response to receipt of the data frame, the receive interface 504 of the port 502 at which the data frame was received pre-classifies the data frame according to the RPI identifier (e.g., S-tag) specified by the data frame and queues the data frame to the ingress vport 522 associated with that RPI (block 904). From block 904, the process depicted in FIG. 9 proceeds to both of blocks 910 and 920.

At block 910, switch controller 530a accesses FIB 532a utilizing the destination MAC address specified by the data frame. If a FIB entry 534 having a matching MAC field 536 is located, processing continues at blocks 922-928, which are described below. If, however, switch controller 530a determines at block 910 that the destination MAC address is unknown, switch controller 530a learns the association between the destination MAC address, egress port 502 and destination RPI utilizing a conventional discovery technique and updates FIB 532a accordingly. The process then proceeds to blocks 922-928.

At block 920, switch controller 530a applies to the data frame any local policy 562 or local ACL 564 specified for the ingress vport 522 by control module 560a. In addition, switch controller 530a performs any other special handling on ingress for the data frame. As discussed in greater detail below, this special handling can include, for example, the implementation of port trunking, priority based flow control, multicasting, port mirroring or ETS. Each type of special handling can be applied to data traffic at ingress and/or at egress, as described further below. The process then proceeds to blocks 922-928.

Referring now to blocks 922-924, switch controller 530a updates the RPI identifier of the data frame to equal that specified in the VPID field 540 of the matching FIB entry 534 (or learned by the discovery process) and queues the data frame in the corresponding egress vport 524 identified by the PID field 538 of the matching FIB entry 534 (or learned by the discovery process). At block 926, switch controller 530a applies to the data frame any local policy 562 or local ACL 564 specified for the egress vport 524 by control module 560a. In addition, switch controller 530a performs any other special handling on egress for the data frame, including, for example, the implementation of port trunking, priority based flow control, multicasting, port mirroring or ETS. Master switch 204 thereafter forwards the data frame via an inter-switch link 206 to the lower tier (e.g., a follower switch 202 or host 302) of the DFP switching network 200 or 300 (block 928). The process shown in FIG. 9 thereafter terminates at block 930.

Figure 10:
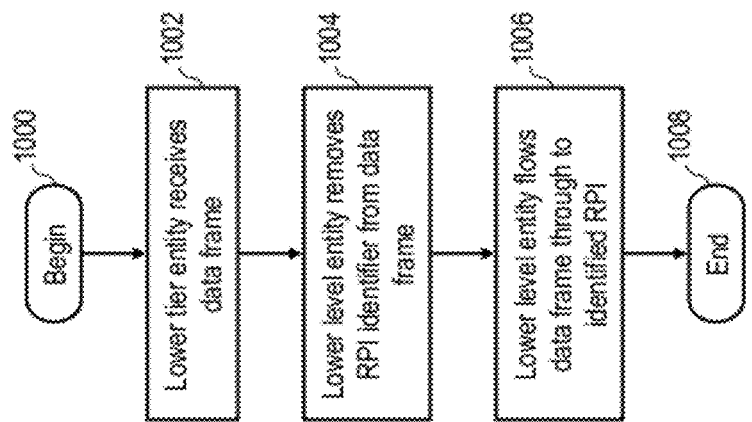
FIG. 10 is a high level logical flowchart of an exemplary process by which a follower switch or host at the lower tier handles a data frame received from a master switch at the upper tier of a DFP switching network in accordance with one embodiment.

Referring now to FIG. 10, there is depicted a high level logical flowchart of an exemplary process by which a follower switch 202 or host 302 at the lower tier handles a data frame received from a master switch at the upper tier of a DFP switching network 200 or 300 in accordance with one embodiment. The process depicted in FIG. 10 begins at block 1000 and then proceeds to block 1002, which illustrates a lower tier entity, such as a follower switch 202 or a host 302, receiving a data frame from a master switch 204, for example, at an inter-switch port 502 of the follower switch 202 or at a network interface 404 or VMM 304 of the host 302.

In response to receipt of the data frame, the lower level entity removes from the data frame the RPI identifier updated by the master switch 204 (block 1004). The lower level entity then flows through the data frame to the RPI identified by the extracted RPI identifier (block 1006). Thus, for example, switch controller 530b accesses its FIB 532b with the RPI and/or destination MAC address of the data frame to identify a matching FIB entry 534 and then controls crossbar 510 to forward the data frame to the port specified in the PID field 538 of the matching FIB entry 534. A network interface 404 or VMM 304 of a host similarly directs the data frame the RPI indicated by the RPI identifier. Thereafter, the process ends at block 1008.

Figure 11:
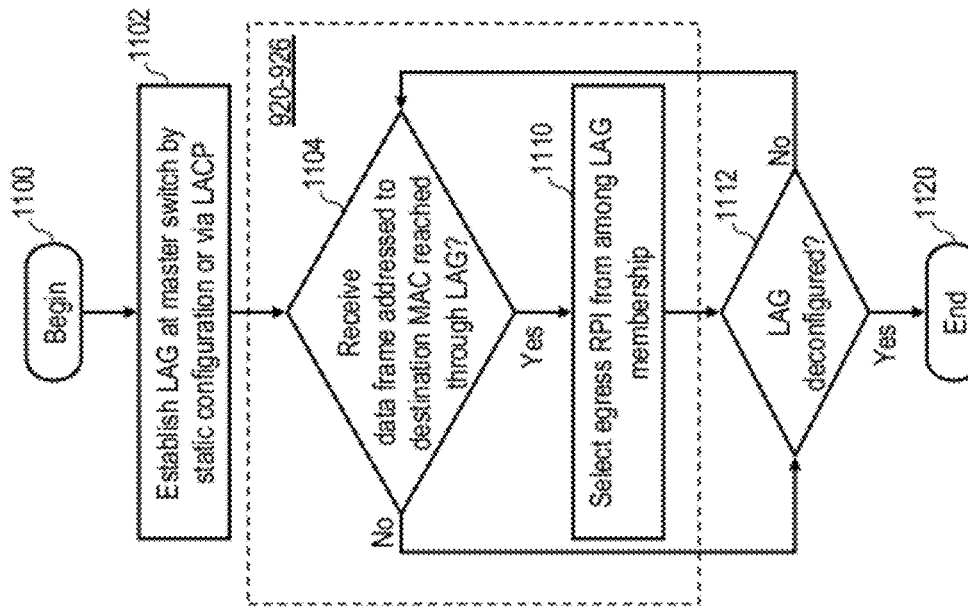
FIG. 11 is a high level logical flowchart of an exemplary method of operating a link aggregation group (LAG) in a DFP switching network in accordance with one embodiment.

With reference now to FIG. 11, there is illustrated a high level logical flowchart of an exemplary method of operating a link aggregation group (LAG) in a DFP switching network in accordance with one embodiment. Link aggregation is also variously referred to in the art as trunking, link bundling, bonding, teaming, port channel, EtherChannel, and multi-link trunking.

The process illustrated in FIG. 11 begins at block 1100 and then proceeds to block 1102, which depicts the establishment at a master switch 204 of a DFP switching network 200 or 300 of a LAG comprising a plurality of RPIs. Unlike conventional LAGs, a LAG established in a DFP switching network 200 or 300 can include RPIs of multiple different (and possibly heterogeneous) follower switches 202 and/or hosts 302. For example, in DFP switching networks 200 and 300 of FIGS. 2-3, a single LAG may include RPIs of one or more of follower switches 202a-202d and/or hosts 302a-302d.

In at least some embodiments, a LAG can be established at a master switch 204 by static configuration of the master switch 204, for example, by a system administrator stationed at one of client devices 110a-110c interacting with management interface 552 of the managing master switch 204. Alternatively or additionally, a LAG can be established at a master switch 204 by the exchange of messages between the master switch 204 and one or more lower tier entities (e.g., follower switches 202 or hosts 302) via the Link Aggregation Control Protocol (LACP) defined in IEEE 802.1AX-2008, which is incorporated herein by reference. Because the LAG is established at the master switch 204, it should be appreciated that not all of the lower level entities connected to a inter-switch link 206 belonging to the LAG need to provide support for (or even have awareness of the existence of) the LAG.

The establishment of a LAG at a master switch 204 as depicted at block 1102 preferably includes recordation of the membership of the LAG in a LAG data structure 1200 in switch controller 530a as shown in FIG. 12. In the depicted exemplary embodiment, LAG data structure 1200 includes one or more LAG membership entries 1202 each specifying membership in a respective LAG. In one preferred embodiment, LAG membership entries 1202 express LAG membership in terms of the RPIs or vports 520 associated with the RPIs forming the LAG. In other embodiments, the LAG may alternatively or additionally be expressed in terms of the inter-switch links 206 connecting the master switch 204 and RPIs. As will be appreciated, LAG data structure 1200 can be implemented as a stand alone data structure or may be implemented in one or more fields of another data structure, such as FIB 532a.

Following establishment of the LAG, master switch 204 performs special handling for data frames directed to RPIs within the LAG, as previously mentioned above with reference to blocks 920-926 of FIG. 9. In particular, as depicted at block 1104, switch controller 530a monitors data frames received for forwarding and determines, for example, by reference to FIB 532a and/or LAG data structure 1200 whether or not the destination MAC address contained in the data frame is known to be associated with an RPI belonging to a LAG. In response to a negative determination at block 1104, the process passes to block 1112, which is described below. If, however, switch controller 532a determines at block 1104 that a data frame is addressed to a destination MAC associated with an RPI belonging to a LAG, switch controller 532a selects an egress RPI for the data frame from among the membership of the LAG.

At block 1110, switch controller 532a can select the egress RPI from among the LAG membership based upon any of a plurality of LAG policies, including round-robin, broadcast, load balancing, or hashed. In one implementation of a hashed LAG policy, switch controller 532a XORs the source and destination MAC addresses and performs a modulo operation on the result with the size of the LAG in order to always select the same RPI for a given destination MAC address. In other embodiments, the hashed LAG policy can select the egress RPI based on different or additional factors, including the source IP address, destination IP address, source MAC address, destination address, and/or source RPI, etc.

As indicated at block 1112, the "spraying" or distribution of data frames across the LAG continues until the LAG is deconfigured, for example, by removing a static configuration of the master switch 204 or via LCAP. Thereafter, the process illustrated in FIG. 11 terminates at block 1120.

The capability of implementing a distributed LAG at a master switch 204 that spans differing lower level entities enables additional network capabilities. For example, in a DFP switching network 300 including multiple VMs 306 providing the same service, forming a LAG having all such VMs as members enables data traffic for the service to be automatically load balanced across the VMs 306 based upon service tag and other tuple fields without any management by VMMs 304. Further, such load balancing can be achieved across VMs 306 running on different VMMs 304 and different hosts 302.

As noted above, the special handling optionally performed at blocks 920-926 of FIG. 9 can include not only the distribution of frames to a LAG, but also multicasting of data traffic. With reference now to FIG. 13, there is depicted a high level logical flowchart of an exemplary method of multicasting in a DFP switching network in accordance with one embodiment. The process begins at block 1300 and then proceeds to blocks 1302-1322, which illustrate the special handling performed by a master switch for multicast data traffic, as previously described with reference to blocks 920-926 of FIG. 9.

Specifically, at block 1310, switch controller 530a of a master switch 204 determines by reference to the destination MAC address or IP address specified within data traffic whether the data traffic requests multicast delivery. For example, IP reserves 224.0.0.0 through 239.255.255.255 for multicast addresses, and Ethernet utilizes at least the multicast addresses summarized in Table I:

TABLE I

| Multicast address | Protocol |
| --- | --- |
| 01:00:0C:CC:CC:CC | Cisco Discovery Protocol or VLAN Trunking Protocol (VTP) |
| 01:00:0C:CC:CC:CD | Cisco Shared Spanning Tree Protocol Addresses |
| 01:80:C2:00:00:00 | IEEE 802.1D Spanning Tree Protocol |

In response to a determination at block 1310 that the data traffic does not require multicast handling, no multicast handling is performed for the data traffic (although other special handling may be performed), and the process iterates at block 1310. If, however, switch controller 530a determines at block 1310 that ingressing data traffic is multicast traffic, process passes to block 1312.

Figure 14:
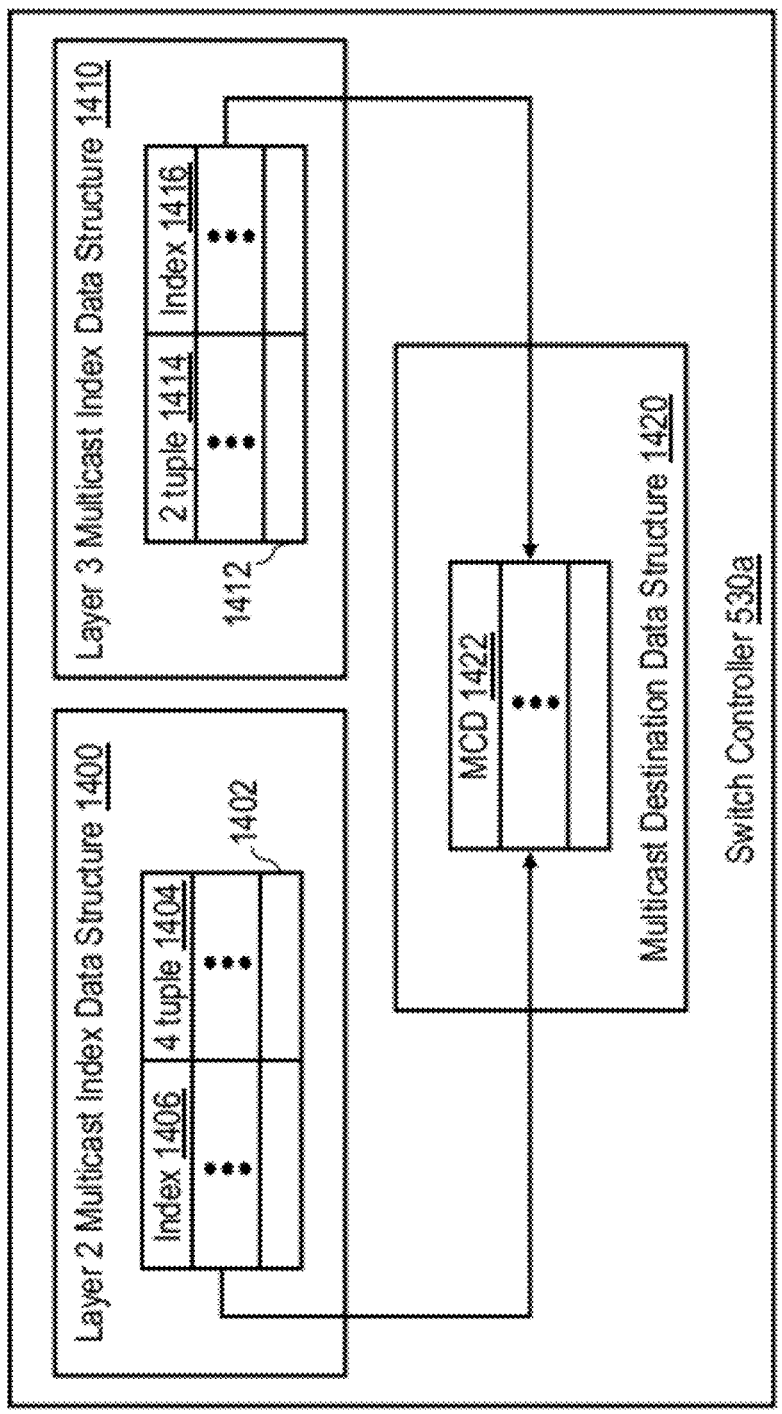
FIG. 14 depicts exemplary embodiments of Layer 2 and Layer 3 multicast index data structures.

At block 1312, switch controller 530a performs a lookup for the multicast data traffic in a multicast index data structure. For example, in one exemplary embodiment shown in FIG. 14, switch controller 530a implements a Layer 2 multicast index data structure 1400 for Layer 2 multicast frames and a Layer 3 multicast index data structure 1410 for Layer 3 multicast packets. In the depicted exemplary embodiment, Layer 2 multicast index data structure 1400, which may be implemented, for example, as a table, includes a plurality of entries 1402 each associating a four-tuple field 1404, which is formed of an ingress RPI, source MAC address, destination MAC address and VLAN, with an index field 1406 specifying an index into a multicast destination data structure 1420. Layer 3 multicast index data structure 1410, which may be similarly implemented as a table, includes a plurality of entries 1412 each associating a two-tuple field 1404, which is formed of a source Layer 3 (e.g., IP) address and multicast group ID, with an index field 1406 specifying an index into a multicast destination data structure 1420. Multicast destination data structure 1420, which can also be implemented as a table or linked list, in turn includes a plurality of multicast destination entries 1422, each identifying one or more RPIs at the lower tier to which data traffic is to be transmitted. Layer 2 multicast data structure 1400, Layer 3 multicast index data structure 1410 and multicast destination data structure 1420 are all preferably populated by the control plane in a conventional MC learning process.

Thus, at block 1312, switch controller 530a performs a lookup to obtain an index into multicast destination data structure 1420 in Layer 2 multicast index data structure 1400 if the data traffic is a Layer 2 multicast frame and performs the lookup in Layer 3 multicast index data structure 1410 if the data traffic is a L3 multicast packet. As indicated at block 1314, master switch 204 can handle the multicast of the data traffic through either ingress replication or egress replication, with the desired implementation preferably configured in switch controller 530a. If egress replication is configured on master switch 204, the process proceeds to block 1316, which illustrates switch controller 530a causing a single copy of the data traffic to traverse crossbar 510 and to be replicated in each egress queue 514 corresponding to an RPI identified in the multicast destination entry 1422 identified by the index obtained at block 1312. As will be appreciated, egress replication of multicast traffic reduces utilization of the bandwidth of crossbar 510 at the expense of head-of-line (HOL) blocking Following block 1316, processing of the replicated data traffic by master switch 204 continues as previously described in FIG. 9 (block 1330).

If, on the other hand, master switch 204 is configured for ingress replication, the process proceeds from block 1314 to block 1320, which illustrates switch controller 530a causing the multicast data traffic to be replicated within each of the ingress queues 506 of the ports 502 having output queues 514 associated with the RPIs identified in the indexed multicast destination entry 1422. As will be appreciated, ingress replication in this manner eliminates HOL blocking Following block 1320, the data traffic undergoes additional processing as discussed above with reference to FIG. 9. In such processing, switch controller 530a controls crossbar 510 to transmit the multicast data traffic replicated on ingress directly from the ingress queues 506 to the egress queues 514 of the same ports 502.

As will be appreciated, the implementation of MC handling at a master switch 204 of a DFP switching network 200 as described rather than at follower switches 202 enables the use of simplified follower switches 202, which need not be capable of multicast distribution of data traffic.

As described above with reference to blocks 920-926 of FIG. 9, the special handling of data traffic in an DFP switching network may optionally include the application of ETS to data traffic. FIG. 15 is a high level logical flowchart of an exemplary method of enhanced transmission selection (ETS) in a DFP switching network 200 or 300 in accordance with one embodiment.

The process depicted in FIG. 15 begins at block 1500 and then proceeds to block 1502, which depicts the configuration of master switch 204 to implement ETS, for example, via management interface 552 on the managing master switch 204 of the DFP switching network 200 or 300. In various embodiments, ETS is configured to be implemented at ingress and/or egress of master switch 204.

ETS, which is defined in draft standard IEEE 802.1Qaz, establishes multiple traffic class groups (TCGs) and specifies priority of transmission (i.e., scheduling) of data traffic in the various TCGs from traffic queues (e.g., ingress vports 522 or egress vports 524) in order to achieve a desired balance of link utilization among the TCGs. ETS not only establishes minimum guaranteed bandwidth for each TCG, but also permits lower-priority traffic to consume utilized bandwidth nominally available to higher-priority TCGs, thereby improving link utilization and flexibility while preventing starvation of lower priority traffic. The configuration of ETS at a master switch 204 can include, for example, the establishing and/or populating an ETS data structure 1600 as depicted in FIG. 16 within the switch controller 530a of the master switch 204. In the exemplary embodiment shown in FIG. 16, ETS data structure 1600, which can be implemented, for example, as a table, includes a plurality of ETS entries 1602. In the depicted embodiment, each ETS entry 1602 includes a TCG field 1604 defining the traffic type(s) (e.g., Fibre Channel (FC), Ethernet, FC over Ethernet (FCoE), iSCSI, etc.) belonging to a given TCG, a minimum field 1606 defining (e.g., in absolute terms or as a percentage) a guaranteed minimum bandwidth for the TCG defined in TCG field 1604, and a maximum field 1608 defining (e.g., in absolute terms or as a percentage) a maximum bandwidth for the TCG defined in TCG field 1604.

Returning to FIG. 15, following the configuration of ETS on a master switch 1502, the process proceeds to blocks 1504-1510, which depict the special handling optionally performed for ETS at blocks 920-926 of FIG. 9. In particular, block 1504 illustrates master switch 204 determining whether or not a data frame received in an ingress vport 520 or egress vport 522 belongs to a traffic class belonging to a presently configured ETS TCG, for example, as defined by ETS data structure 1600. As will be appreciated, the data frame can be classified based upon the Ethertype field of a conventional Ethernet frame or the like. In response to a determination at block 1504 that the received data frame does not belong to an presently configured ETS TCG, the data frame receives best efforts scheduling, and the process proceeds to block 1512, which is described below.

Returning to block 1504, in response to a determination the received data frame belongs to a presently configured ETS TCG, master switch 204 applies rate limiting and traffic shaping to the data frame to comply with the minimum and maximum bandwidths specified for the ETS TCG within the fields 1606, 1608 of the relevant ETS entry 1602 of ETS data structure 1600 (block 1510). As noted above, depending on configuration, master switch 204 can apply the ETS to the VOQs at ingress vports 522 and/or egress vports 524. The process then proceeds to block 1512, which illustrates that master switch 204 implements ETS for a traffic class as depicted at blocks 1504 and 1510 until ETS is deconfigured for that traffic class. Thereafter, the process illustrated in FIG. 15 terminates at block 1520.

Figure 17:
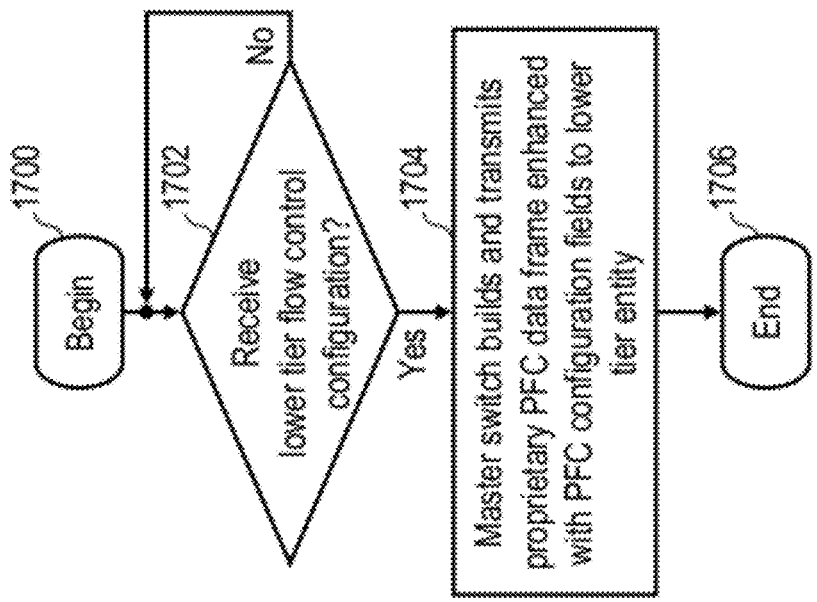
FIG. 17 is a high level logical flowchart of an exemplary method by which a DFP switching network implements priority-based flow control (PFC) and/or other services at a lower tier.

In a DFP switching network 200 or 300, flow control can advantageously be implemented not only at master switches 204, as described with reference to FIGS. 15-16, but also at the RPIs of lower tier entities, such as follower switches 202 and hosts 302. With reference now to FIG. 17, there is illustrated a high level logical flowchart of an exemplary method by which a DFP switching network 200 or 300 implements priority-based flow control (PFC) and/or other services at a lower tier.

The process shown in FIG. 17 begins at block 1700 and then proceeds to block 1702, which represents a master switch 204 implementing priority-based flow control (PFC) for an entity at a lower tier of a DFP switching network 200 or 300, for example, in response to (1) receipt at a managing master switch 204 executing a management module 550 of a PFC configuration for a virtualized port 602a-602d corresponding to at least one RPI of a lower tier entity or (2) receipt at a master switch 204 of a standards-based PFC data frame originated by a downstream entity in the network and received at the master switch 204 via a pass-through follower switch 202. As will be appreciated by those skilled in the art, a standards-based PFC data frame can be generated by a downstream entity that receives a data traffic flow from an upstream entity to notify the upstream entity of congestion for the traffic flow. In response to an affirmative determination at block 1702 that a master switch 204 has received a PFC configuration for a lower tier entity, the process proceeds to block 1704, which illustrates the master switch 204 building and transmitting to at least one lower tier entity (e.g., follower switch 202 or host 302) a proprietary data frame enhanced with PFC configuration fields (hereinafter called a proprietary PFC data frame) in order to configure the lower tier entity for PFC. Thereafter, the process depicted in FIG. 17 ends at block 1706.

Figure 18:
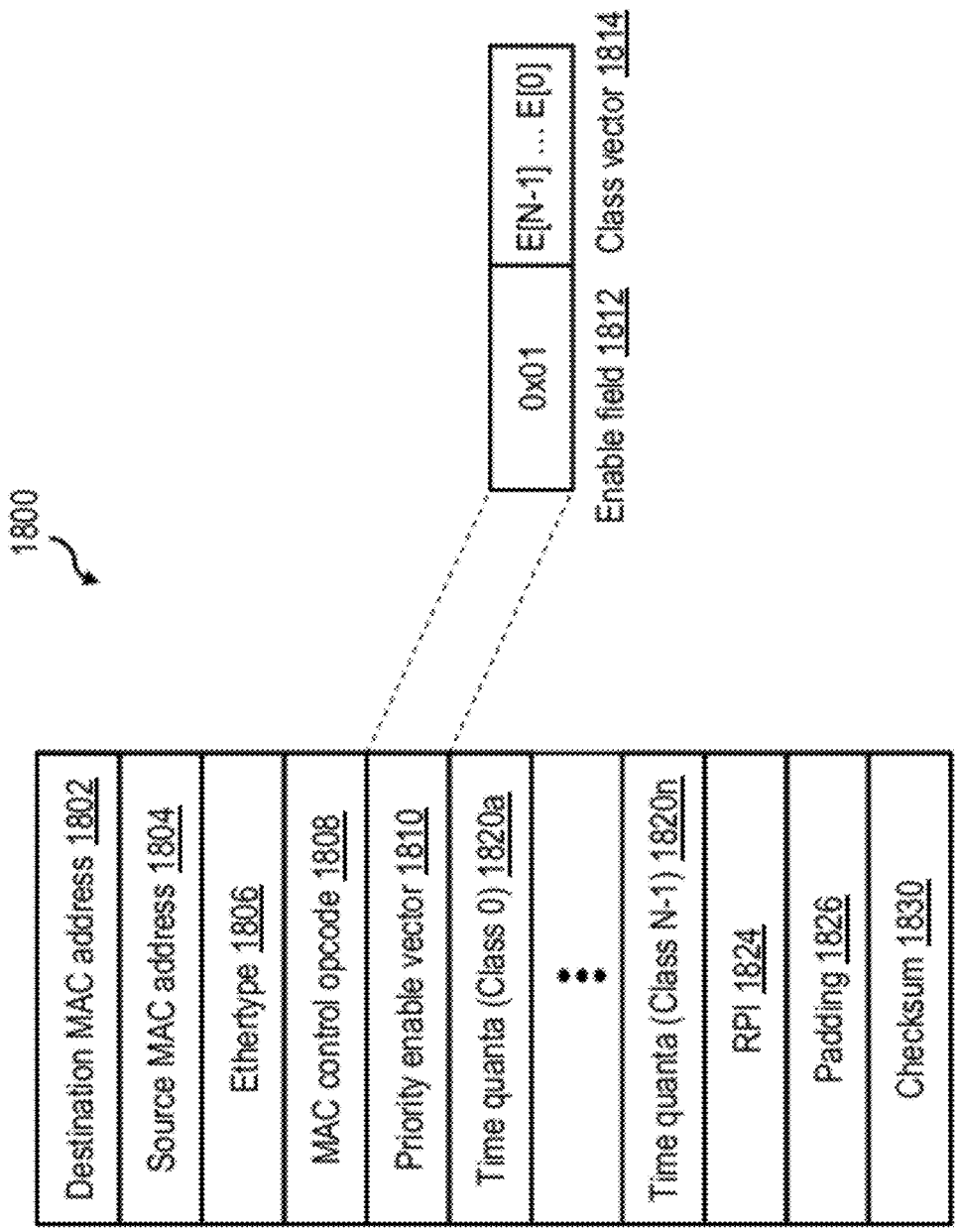
FIG. 18 depicts an exemplary PFC data frame 1800 that may be utilized to implement priority-based flow control (PFC) and/or other services at a lower tier of a DFP switching network in accordance with one embodiment.

Referring now to FIG. 18, there is depicted the structure of an exemplary proprietary PFC data frame 1800 in accordance with one embodiment. As previously described with reference to block 1704 of FIG. 17, proprietary PFC data frame 1800 may be built by a master switch 204 and transmitted to a lower tier entity of a DFP switching network, such as a follower switch 202 or host 302, in order to implement PFC at the lower tier entity.

In the depicted exemplary embodiment, proprietary PFC data frame 1800 is implemented as an expanded Ethernet MAC control frame. Proprietary PFC data frame 1800 consequently includes a destination MAC address field 1802 specifying the MAC address of an RPI at the lower tier entity from which the master switch 204 may receive data frames and a source MAC address field 1804 identifying the egress vport on master switch 204 from which the proprietary PFC data frame 1800 is transmitted. Address fields 1802, 1804 are followed by an Ethertype field 1806 identifying PFC data frame 1800 as a MAC control frame (e.g., by a value of 0x8808).

The data field of proprietary PFC data frame 1800 then begins with a MAC control opcode field 1808 that indicates proprietary PFC data frame 1800 is for implementing flow control (e.g., by a PAUSE command value of 0x0101). MAC control opcode field 1808 is followed by a priority enable vector 1810 including an enable field 1812 and a class vector field 1814. In one embodiment, enable field 1812 indicates by the state of the least significant bit whether or not proprietary PFC data frame 1800 is for implementing flow control at an RPI at the lower tier entity that is the destination of proprietary PFC data frame 1800. Class vector 1814 further indicates, for example, utilizing multi-hot encoding, for which of N classes of traffic that flow control is implemented by proprietary PFC data frame 1800. Following priority enable vector 1810, proprietary PFC data frame 1800 includes N time quanta fields 1820a-1820n each corresponding to a respective one of the N classes of traffic for which flow control can be implemented. Assuming enable field 1812 is set to enable flow control for RPIs and the corresponding bit in class vector 1814 is set to indicate flow control for a particular traffic class, a given time quanta filed 1820 specifies (e.g., as a percentage or as an absolute value) a maximum bandwidth of transmission by the RPI of data in the associated traffic class. The RPI for which flow control is configured by proprietary PFC data frame 1800 is further specified by RPI field 1824.

Following the data field, proprietary PFC data frame 1800 includes optional padding 1826 to obtain a predetermined size of proprietary PFC data frame 1800. Finally, proprietary PFC data frame 1800 includes a conventional checksum field 1830 utilized to detect errors in proprietary PFC data frame 1800.

As will be appreciated, proprietary PFC data frame 1800 can be utilized to trigger functions other than flow control for RPIs. For example, proprietary PFC data frame 1800 can also be utilized to trigger services (e.g., utilizing special reserved values of time quanta fields 1820) for a specified RPI. These additional services can include, for example, rehashing server load balancing policies, updating firewall restrictions, enforcement of denial of service (DOS) attack checks, etc.

Figure 19A:
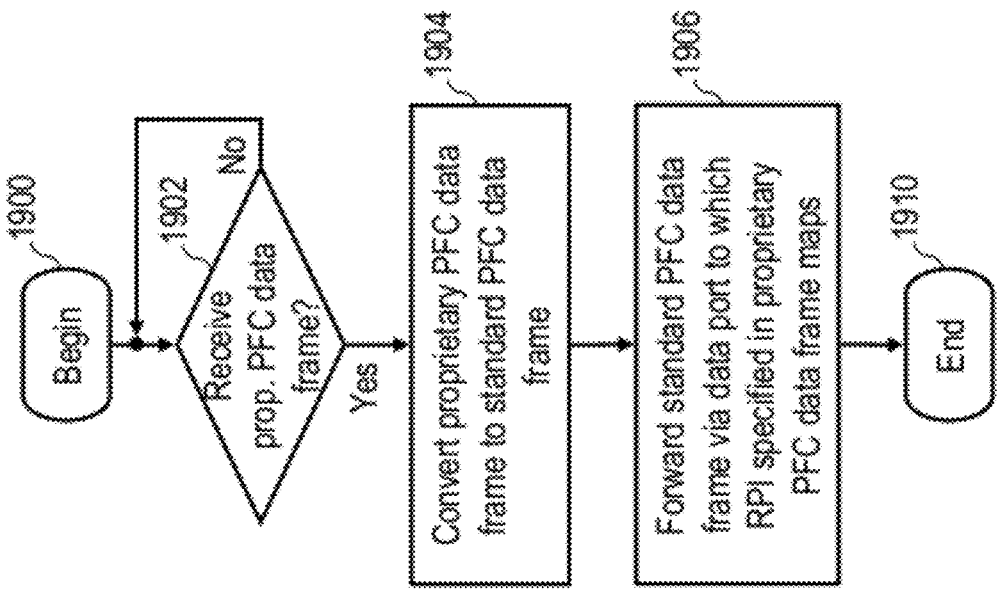
FIG. 19A is a high level logical flowchart of an exemplary process by which a lower level follower switch of a DFP switching network processes a PFC data frame received from a master switch in accordance with one embodiment.

With reference to FIG. 19A, there is illustrated a high level logical flowchart of an exemplary process by which a lower level entity of a DFP switching network 200 or 300, such as a follower switch 202, processes a proprietary PFC data frame 1800 received from a master switch 204 in accordance with one embodiment.

The process begins at block 1900 and then proceeds to block 1902, which illustrates a pass through lower level entity, such as a follower switch 202, monitoring for receipt of a proprietary PFC data frame 1800. In response to receipt of a proprietary PFC data frame 1800, which is detected, for example, by classification based on MAC control opcode field 1808, the process proceeds from block 1902 to block 1904. Block 1904 depicts the follower switch 202 (e.g., switch controller 530b) converting the proprietary PFC data frame 1800 to a standards-based PFC data frame, for example, by extracting non-standard fields 1810, 1820 and 1824. Follower switch 202 then determines an egress data port 210 for the standards-based PFC data frame, for example, by converting the RPI extracted from RPI field 1824 into a port ID by reference to FIB 532b, and forwards the resulting standards-based PFC data frame via the determined egress data port 210 toward the source of data traffic causing congestion (block 1906). Thereafter, the process shown in FIG. 19A ends at block 1910. It should be noted that because PFC can be individually implemented per-RPI, the described process can be utilized to implement different PFC for different RPIs on the same lower tier entity (e.g., follower switch 202 or host 302). Further, because the RPIs at the lower tier entities are represented by VOQs 604, individualized PFC for one or more of RPIs can alternatively and selectively be implemented at master switches 204, such that the same port 502 implements different PFC for data traffic of different vports 522, 524.

Figure 19B:
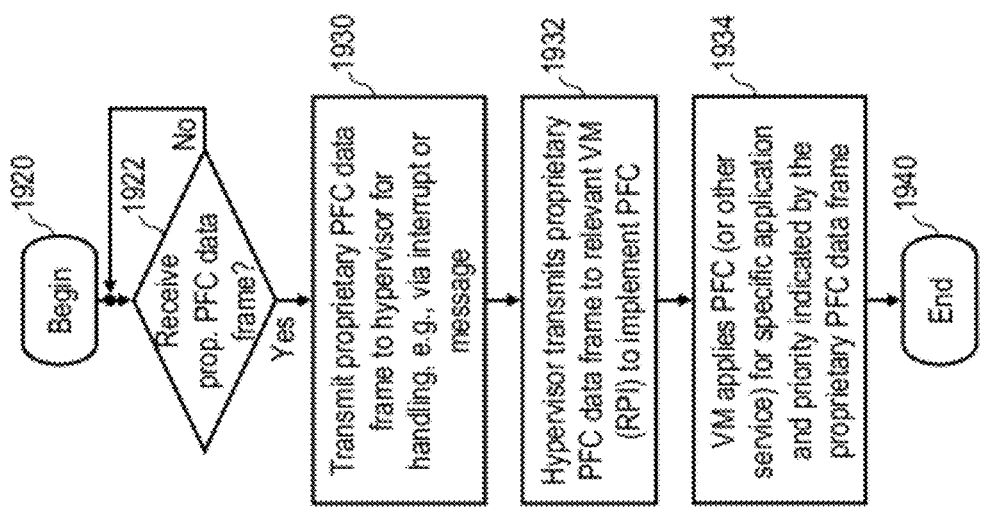
FIG. 19B is a high level logical flowchart of an exemplary process by which a lower level host in a DFP switching network processes a PFC data frame received from a master switch in accordance with one embodiment.

Referring now to FIG. 19B, there is depicted a high level logical flowchart of an exemplary process by which a lower level entity of a DFP switching network 200 or 300, such as a host platform 302, processes a proprietary PFC data frame 1800 received from a master switch 204 in accordance with one embodiment.

The process begins at block 1920 and then proceeds to block 1922, which illustrates a network interface 404 (e.g., a CNA or NIC) of a host platform 302 monitoring for receipt of a proprietary PFC data frame 1800, for example, by classifying ingressing data frames based on MAC control opcode field 1808. In response to detecting receipt of a proprietary PFC data frame 1800, the process proceeds from block 1922 to block 1930. Block 1930 depicts the network interface 404 transmitting the proprietary PFC data frame 1800 to VMM 304 for handling, for example, via an interrupt or other message. In response to receipt of the proprietary PFC data frame 1800, hypervisor 304 in turn transmits the proprietary PFC data frame 1800 to the VM 306 associated with the RPI indicated in RPI field 1824 of the proprietary PFC data frame 1800 (block 1932). In response, VM 306 applies PFC (or other service indicated by proprietary PFC data frame 1800) for the specific application and traffic priority indicated by proprietary PFC data frame 1800 (block 1934). Thus, PFC can be implemented per-priority, per-application, enabling, for example, a data center server platform to apply a different PFC to a first VM 306 (e.g., a video streaming server) than to a second VM 306 (e.g., an FTP server), for example, in response to back pressure from a video streaming client in communication with the data center server platform. Following block 1934, the process depicted in FIG. 19B ends at block 1940.

As has been described, in some embodiments, a switching network includes an upper tier including a master switch and a lower tier including a plurality of lower tier entities. The master switch includes a plurality of ports each coupled to a respective one of the plurality of lower tier entities. Each of the plurality of ports includes a plurality of virtual ports each corresponding to a respective one of a plurality of remote physical interfaces (RPIs) at the lower tier entity coupled to that port. Each of the plurality of ports also includes a receive interface that, responsive to receipt of data traffic from a particular lower tier entity among the plurality of lower tier entities, queues the data traffic to the virtual port among the plurality of virtual ports that corresponds to the RPI on the particular lower tier entity that was the source of the data traffic. The master switch further includes a switch controller that switches data traffic from the virtual port to an egress port among the plurality of ports from which the data traffic is forwarded.

In some embodiments of a switching network including an upper tier and a lower tier, a master switch in the upper tier, which has a plurality of ports each coupled to a respective lower tier entity, implements on each of the ports a plurality of virtual ports each corresponding to a respective one of a plurality of remote physical interfaces (RPIs) at the lower tier entity coupled to that port. Data traffic communicated between the master switch and RPIs is queued within virtual ports that correspond to the RPIs on lower tier entities with which the data traffic is communicated. The master switch enforces priority-based flow control (PFC) on data traffic of a given virtual port by transmitting, to a lower tier entity on which a corresponding RPI resides, a PFC data frame specifying priorities for at least two different classes of data traffic communicated by the particular RPI.

In some embodiments of a switching network including an upper tier and a lower tier, a master switch in the upper tier, which has a plurality of ports each coupled to a respective lower tier entity, implements on each of the ports a plurality of virtual ports each corresponding to a respective one of a plurality of remote physical interfaces (RPIs) at the lower tier entity coupled to that port. Data traffic communicated between the master switch and RPIs is queued within virtual ports that correspond to the RPIs with which the data traffic is communicated. The master switch applies data handling to the data traffic in accordance with a control policy based at least upon the virtual port in which the data traffic is queued, such that the master switch applies different policies to data traffic queued to two virtual ports on the same port of the master switch.

While the present invention has been particularly shown as described with reference to one or more preferred embodiments, it will be understood by those skilled in the art that various changes in form and detail may be made therein without departing from the spirit and scope of the invention. For example, although aspects have been described with respect to one or more machines (e.g., hosts and/or network switches) executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions.

What is claimed is:

1. A switching network, including:
an upper tier including a master switch and a lower tier including a plurality of lower tier entities, wherein the master switch includes:
　a plurality of ports each coupled to a respective one of the plurality of lower tier entities, each of the plurality of ports including a plurality of virtual ports each corresponding to a respective one of a plurality of remote physical interfaces (RPIs) at the lower tier entity coupled to that port, wherein data traffic communicated between the master switch and RPIs on the plurality of lower tier entities is queued to virtual ports among the plurality of virtual ports that correspond to the RPIs on lower tier entities with which the data traffic is communicated; and
　a switch controller that switches data traffic between the plurality of ports;
　wherein the master switch enforces priority-based flow control (PFC) on data traffic of a given virtual port by transmitting, to a lower tier entity at which a particular RPI corresponding to the given virtual port resides, a PFC data frame specifying priorities for at least two different classes of data traffic communicated by the particular RPI;
　wherein:
　　the lower tier entity comprises a follower switch configured in flow through mode;
　　the particular RPI comprises a data port on the follower switch; and
　　the follower switch receives the PFC data frame, removes an RPI identifier identifying the particular RPI from the PFC data frame to obtain a standard PFC data frame, and transmits the standard PFC data frame via the data port corresponding to the particular RPI.

2. The switching network of claim 1, wherein:
the data traffic communicated between the master switch and the plurality of lower tier entities includes RPI identifiers identifying RPIs on the lower tier entities with which the traffic is communicated; and
the master switch queues data traffic to its virtual ports based on the RPI identifier.

3. The switching network of claim 1, wherein the master switch enforces PFC per-priority, per-application.

4. The switching network of claim 1, wherein the PFC frame includes:
an RPI field identifying the particular RPI; and
a plurality of fields specifying relative priorities for the at least two different classes of data traffic.

5. The switching network of claim 1, wherein the master switch enforces differing priority-based flow control for two different RPIs on the lower tier entity.

6. The switching network of claim 1, wherein the particular RPI comprises one of a set including a physical port, a link aggregation group (LAG) interface and a virtual port.

7. The switching network of claim 6, wherein the virtual port comprises one of a set including a virtual network interface card (NIC), Single Root I/O Virtualization (SR-IOV) NIC partition, and FibreChannel over Ethernet (FCoE) port.

8. A program product, comprising:
a non-transitory machine-readable storage device; and
program code stored within the machine-readable storage medium, wherein the program code, when processed by a machine, causes the machine to perform:
in a switching network including an upper tier having a master switch and a lower tier having a plurality of lower tier entities, the master switch having a plurality of ports each coupled to a respective one of the plurality of lower tier entities, the master switch implementing on each of the plurality of ports a plurality of virtual ports each corresponding to a respective one of a plurality of remote physical interfaces (RPIs) at the lower tier entity coupled to that port; the master switch queuing data traffic communicated between the master switch and RPIs on the plurality of lower tier entities within virtual ports among the plurality of virtual ports that correspond to the RPIs on lower tier entities with which the data traffic is communicated; and
the master switch enforcing priority-based flow control (PFC) on data traffic of a given virtual port by transmitting, to a lower tier entity at which a particular RPI corresponding to the given virtual port resides, a PFC data frame specifying priorities for at least two different classes of data traffic communicated by the particular RPI; wherein:
the lower tier entity comprises a follower switch configured in flow through mode;
the particular RPI comprises a data port on the follower switch; and
the program code further causes the follower switch to receive the PFC data frame, remove an RPI identifier identifying the particular RPI from the PFC data frame to obtain a standard PFC data frame, and transmit the standard PFC data frame via the data port corresponding to the particular RPI.

9. The program product of claim 8, wherein:
the data traffic communicated between the master switch and the plurality of lower tier entities includes RPI identifiers identifying RPIs on the lower tier entities with which the traffic is communicated; and
the queuing includes queuing the data traffic to virtual ports on the master switch based on the RPI identifiers.

10. The program product of claim 8, wherein the program code causes the master switch to enforce PFC per-priority, per-application.

11. The program product of claim 8, wherein the PFC frame includes:
an RPI field identifying the particular RPI; and
a plurality of fields specifying relative priorities for the at least two different classes of data traffic.

12. The program product of claim 8, wherein the enforcing includes the master switch enforcing differing priority-based flow control for two different RPIs on the lower tier entity.

* * * * *